(12) United States Patent
Sirkin et al.

(10) Patent No.: US 11,912,379 B2
(45) Date of Patent: Feb. 27, 2024

(54) TECHNIQUES FOR MONITORING WINDLASS ROTATION

(71) Applicants: Eric R. Sirkin, Shoreline, WA (US); Xavier Alexandre, Jerusalem (IL)

(72) Inventors: Eric R. Sirkin, Shoreline, WA (US); Xavier Alexandre, Jerusalem (IL)

(*) Notice: Subject to any disclaimer, the term of this patent is extended or adjusted under 35 U.S.C. 154(b) by 0 days.

(21) Appl. No.: 17/937,448

(22) Filed: Oct. 1, 2022

(65) Prior Publication Data

US 2023/0032340 A1 Feb. 2, 2023

Related U.S. Application Data

(63) Continuation-in-part of application No. PCT/US2021/027151, filed on Apr. 13, 2021.

(Continued)

(51) Int. Cl.
| | |
|---|---|
| *G01B 11/04* | (2006.01) |
| *B63B 79/10* | (2020.01) |
| *G06T 7/73* | (2017.01) |
| *G06T 7/62* | (2017.01) |
| *G06F 3/04883* | (2022.01) |
| *G06F 3/04845* | (2022.01) |
| *H04R 1/32* | (2006.01) |
| *G10L 25/51* | (2013.01) |

(Continued)

(52) U.S. Cl.
CPC ............ *B63B 79/10* (2020.01); *B63B 21/00* (2013.01); *B63B 21/20* (2013.01); *G01B 11/043* (2013.01); *G01D 5/26* (2013.01); *G01P 15/18* (2013.01); *G06F 3/04845* (2013.01); *G06F 3/04883* (2013.01); *G06T 7/62* (2017.01); *G06T 7/74* (2017.01); *G10L 25/51* (2013.01); *H04N 23/632* (2023.01); *H04N 23/635* (2023.01); *H04R 1/326* (2013.01); *B63B 2021/003* (2013.01); *B63B 2021/203* (2013.01); *B63B 2201/00* (2013.01); *G06T 2200/24* (2013.01); *G06T 2207/10016* (2013.01); *G06T 2207/30204* (2013.01)

(58) Field of Classification Search
CPC .... G01B 11/26; G01B 21/042; G01B 11/043; G01B 11/022; G01B 17/00; G01S 3/782
See application file for complete search history.

(56) References Cited

U.S. PATENT DOCUMENTS

| | | | | |
|---|---|---|---|---|
| 4,651,139 A | * | 3/1987 | Oettli | B63B 21/22 |
| | | | | 114/294 |
| 4,912,464 A | * | 3/1990 | Bachman | B63B 21/22 |
| | | | | 367/141 |

(Continued)

FOREIGN PATENT DOCUMENTS

| | | | | |
|---|---|---|---|---|
| GB | 2610328 A | * | 3/2023 | ............. B63B 21/00 |

*Primary Examiner* — Yaritza Guadalupe-McCall
(74) *Attorney, Agent, or Firm* — Microtechnology Law & Analysis; Daniel L. Flamm

(57) ABSTRACT

Methods and apparatus for monitoring windlass rotation are provided to determine the real time rate and length of rode release when anchoring a boat. The rotation can be monitored in real time using directional sound and/or electromagnetic radiation receivers and/or transmitter in a module attached to the windlass. Another windlass module can monitor windlass rotation using micro-electromechanical systems (MEMS) components such as accelerometers, magnetometers, gyroscopes, and/or inertial measurement units (IMU) to sense motion and/or position.

19 Claims, 17 Drawing Sheets

Related U.S. Application Data

(60) Provisional application No. 63/009,443, filed on Apr. 13, 2020.

(51) Int. Cl.
  *B63B 21/20* (2006.01)
  *H04N 23/63* (2023.01)
  *B63B 21/00* (2006.01)
  *G01D 5/26* (2006.01)
  *G01P 15/18* (2013.01)

(56) References Cited

U.S. PATENT DOCUMENTS

| | | | | |
|---|---|---|---|---|
| 7,034,680 | B2 * | 4/2006 | Grunder | B63B 21/00 |
| | | | | 340/539.1 |
| 7,658,843 | B2 * | 2/2010 | Krock | C02F 1/441 |
| | | | | 210/652 |
| 9,250,082 | B2 * | 2/2016 | Frizlen | B63B 21/22 |
| 9,671,231 | B2 * | 6/2017 | O'Sullivan, Jr. | G01S 19/42 |
| 11,396,352 | B2 * | 7/2022 | Sirkin | G06T 7/74 |
| 2014/0222336 | A1 * | 8/2014 | Frizlen | B63B 21/22 |
| | | | | 701/527 |
| 2015/0116496 | A1 * | 4/2015 | Ottaviano | B63B 21/227 |
| | | | | 348/148 |
| 2019/0217924 | A1 * | 7/2019 | Frizlen | G01S 11/14 |
| 2020/0216145 | A1 * | 7/2020 | Frizlen | B63B 21/22 |
| 2021/0316827 | A1 * | 10/2021 | Sirkin | H04N 23/635 |
| 2021/0339831 | A1 * | 11/2021 | Tcherniguin | B63B 79/30 |
| 2022/0024549 | A1 * | 1/2022 | Biancale | G01P 15/032 |
| 2022/0234693 | A1 * | 7/2022 | Suppa | B63B 21/66 |
| 2022/0242533 | A1 * | 8/2022 | Tolley | B63B 79/10 |
| 2023/0032340 | A1 * | 2/2023 | Sirkin | B63B 21/20 |

* cited by examiner

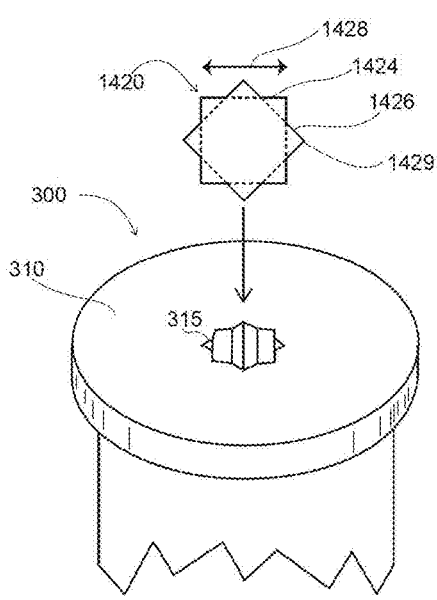 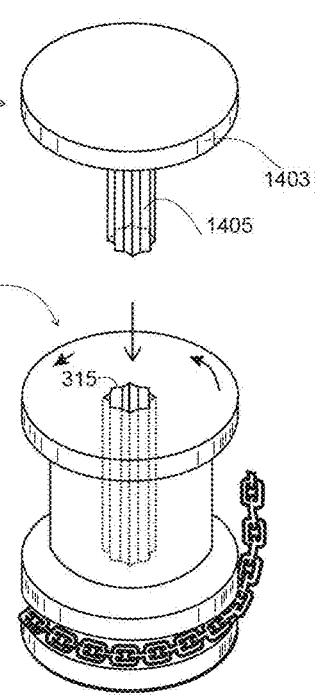 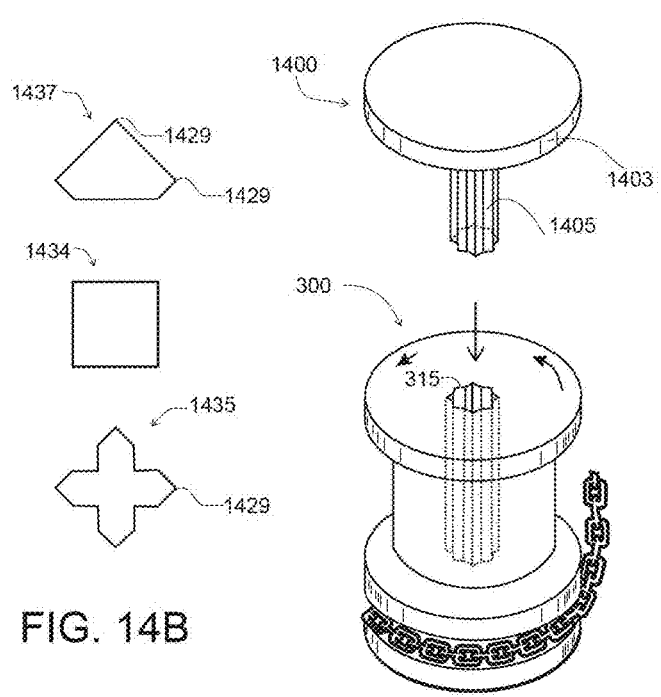
FIG. 14A
FIG. 14B
FIG. 14C

TECHNIQUES FOR MONITORING WINDLASS ROTATION

CROSS-REFERENCES TO RELATED APPLICATIONS

This present application is a continuation-in part of pending application PCT/US2021/027151 filed Apr. 13, 2021 which claims the benefit of U.S. Provisional Application No. 63/009,443 filed Apr. 13, 2020.

FIELD OF THE INVENTION

The present application relates generally to the art of affixing a boat to a position in a body of water and more particularly relates to methods and apparatus using computer vision, electromagnetic radiation such as light, sound, micro-mechanical devices, digital signal processing, artificial intelligence, and/or augmented reality to monitor a windlass rotation and rode release for anchoring a boat in a body of water.

BACKGROUND

Marine vessels can range in size from 6-meter-long recreational power boats to 350-meter-long aircraft carriers. All require anchoring (for example see FIG. 1) to maintain the position of a boat 100 in a body of water 105 and prevent it from being moved by, water currents and forces 110. A boat operator ("skipper") can be tasked with setting an anchor 115 at a designated geophysical anchor site 120. The anchor is attached to a boat near its bow 135 by a tether 125, called a rode, which can be a rope or chain. The rode can be made from a variety of materials such as nylon, polyester, kevlar, iron, steel, and others, depending on the application. The anchor can become embedded in a seabed 130 and tension transmitted through the connecting rode can hold the bow. The boat 100 may move (see for example, FIG. 2) along an arc 205 drawn around the anchor site 120. The radius of the arc depends on the rode length and the amount of tension required to support the various forces 110 that wind, currents, and/or waves apply to the boat 100.

A skipper must ensure that the boat 100 does not collide with nearby objects such as another boat 215, rocks 220, coral, and/or a marina or pier as the boat moves along the arc 205 (as shown in FIG. 2). Anchor control of boat position is commonly used in a body of water 105 where the water level is sufficiently shallow to permit an anchor 115 that is set in the seabed to be attached to the boat with a rode 125 (seabed will be understood to mean the bottom of any body of water including a lake, river, ocean, etc). In some circumstances, a skipper/crew may use two or more anchors respectively attached to different positions on the boat, for example bow and stern, to hold both of these points in relatively fixed positions.

In the process of anchoring, an anchor site is selected by taking into consideration water depth, prevailing wind/current, and proximity of nearby objects (for example other boats, rocks, shore, marina, etc.). Depending upon weather, boat size and other factors, a boat crew releases a length of anchor rode that is approximately 6-8 times the depth of water at the anchor site. Generally, the boat is first moved to position where its bow is above the selected anchor site, before starting release of the anchor rode. After the descending anchor reaches the sea bed, the boat generally moves downwind from the anchor site, stern first, and additional rode is continually released rode as the boat moves. Anchor rode must be released at a faster rate than the boat speed to prevent 'dragging' the anchor along the seabed from the selected site. At the end of this process, a crew may test the success of a set anchor operation by powering the boat in reverse for several seconds, before removing power (neutral) to see whether the tension from the rode causes the boat to spring forward in the direction of the anchor site. This method and test are not reliable and the result is a boat not securely anchored.

Anchor rode is released or retrieved with equipment comprising a rotating pulley device called a windlass (WL). A vertical WL 300, as shown in FIG. 3, is so called because its axis is perpendicular to the deck to which it is mounted. The rode (chain in this case) 125 is released as the WL turns counter clockwise, and it is retrieved (also known as gathering) when it rotates clockwise. The chain is fed through a WL gypsy 305 with sprockets engaging each link in the chain. A windlass capstan (WLC) 310 at the top of the WL has a winch handle socket 315 at its center. FIG. 4 shows an expanded view of the gypsy 305 having a diameter 405, showing details of the sprockets that lock onto chain links 125 as the gypsy rotates.

Another vertical WL 300 is shown in FIG. 5 mounted to boat deck 505. Rode 125 and anchor 115 are in a fully retrieved position. AWL can be powered from a boat's battery bank. The WL motor is usually a single speed high torque motor having one push button control 510 that turns the motor on in a rotation direction to release rode 125 (and the anchor 115), and another push button control 515 to run the motor in the opposite direction to gather rode 125 and retrieve the anchor 115. These controls cannot change motor speed. FIG. 6 shows a horizontal WL 300 mounted below a boat deck 605.

Anchor position can be maintained through friction with a seabed. The forces in play applied to an anchored boat are illustrated in FIG. 7. A boat 100 is fixed under tension applied by rode 125 running between windlass bow 135 and anchor 115 which has been set at the seabed 130. The mass of the anchor and rode result in a gravitational force $F_g$ 705 perpendicular to the seabed that is proportional to their combined masses according to EQ. 1:

$$F_g = G^*(m_{anchor} + m_{rode})^* m_{earth}/R^2 \text{earth} \qquad \text{EQ. 1}$$

Where G is the gravitational constant and $R_{earth}$ is the radius of the earth. The gravitational force on the anchor ultimately results in a force of friction $F_f$ 710 acting in the opposite direction of wind and current forces 110 on the boat 100 according to:

$$F_f = \mu^* F_g \qquad \text{EQ. 2}$$

where the parameter $\mu$ is an environment-dependent coefficient of friction. The gravitational force $F_g$, and hence the frictional force $F_f$, is proportional to the sum of the anchor $m_{anchor}$ and released rode $m_{rode}$ mass resting on the sea bed. That mass must be sufficient to result in a frictional force exceeding the forces of the wind and current 110 on the boat in order to keep the boat secure in its anchorage. This frictional force $F_f$ increases with the length of a rode having contact with the seabed. Hence it is often desirable to have a substantial length of rode laying along the seabed which can add tangential restraining force for a boat. In FIG. 7, chord 720 of length H drawn between the ends of the catenary formed by rode 125 which connects bow 135 to the anchor 115, forms an hypotenuse of a right triangle having an interior angle θ relative to the horizontal plane of the sea, leg 715 with a length equal to the water depth (d), and leg 725 equal to the horizontal distance L along the seabed between the boat and the anchor site (e.g. the point where the tangent to the catenary curve has flattened to within about 3 degrees of horizontal) 725. It can be seen:

$$\theta = \arctan(d/L), \qquad \text{EQ. 3}$$

$$L/H = \cos(\theta) \qquad \text{EQ. 4}$$

In an ideal hypothetical scenario, a helmsman might move a boat on the surface of a body of water into a predetermined anchoring position above preselected anchoring site, and maintain that position while a crew member releases a length of rode substantially equal to the distance d shown in FIG. 7, such as is necessary to lower the anchor vertically and lay on the seabed. In this fictitious scenario, once the anchor is in frictional contact with the seabed underneath the boat, a helmsman can back up the boat while a suitable length of additional rode is simultaneously released. However, those skilled in the will appreciate that this hypothetical scenario is not practical at least because the boat is subject to drift while the anchor is being lowered, such that its geophysical position moves away from the anchoring site. Hence local depth of the seabed as well as the point at which the anchor finally reaches the seabed in reality can be unknown, and the anchor is generally not visible through many feet of water. Furthermore, a combined force arising from the weight of the anchor and the forces applied from an appreciable length of rode may be necessary to set the anchor in the seabed securely. This often requires the rode to have sufficient length form a catenary curve that has flattened to within about 3 degrees of horizontal (e.g. $\theta \leq 3°$) in the neighborhood of the anchor.

As a practical matter, owing to these uncertainties, rode release is started when the boat reaches a preselected set anchor position. The rode is released as fast as practical in order to minimize horizontal force on the anchor as a helmsman powers the boat backward, so as to effectuate tension that will set the anchor after it makes contact with the seabed. It is important that the rate of rode release must far exceed the boat speed in order to minimize any horizontal displacement of the anchor position before the anchor makes effective contact with the seabed (e.g. minimize dragging). As is generally depicted in FIG. 7, the resulting catenary formed by the rode should ultimately have a relatively long leg "L" (725) reflective of the relatively high rate of rode release relative to the speed of the boat 100 as it is piloted during the anchoring operation. In typical instance, the length of rode released during a set anchor operation, e.g. the length of catenary 125, can be about 6 to 8 times the water depth d.

An anchor that has not been set properly can be problematic and/or dangerous. A reliable anchoring process depends on moving the boat to compensate for drift while releasing the anchor. It can be quite difficult to simultaneously control boat movement and chain release speeds with respect to one another. If the boat moves faster than the rate of chain release after the anchor touches the seabed, the anchor may drag along the seabed surface without locking into the target anchoring site.

Anchor dragging can occur even when the boat is in a protected bay. A boat approaching a shore from the sea can be anchored, at a site having a suitable depth for safe anchor, near the shore. Here, a boat will typically drop anchor and move backwards away from the shore toward deeper water as the chain is released from the bow. However, if there is an unexpected change in ratio between water depth and chain length, the anchor may be dragged into deeper water. The crew may believe it has deployed a sufficient length of chain whereas the boat may actually be coupled to an untethered anchor in deep water. This is an insecure situation. It will be apparent that reliable knowledge of the water depth and measurements of the length of chain released are crucial.

Boat speed can be a critical variable as well. If a boat backs up too slowly, the chain may not apply enough stress to set the anchor properly. In an extreme case, this can result in chain piling up on the seabed. Alternatively, the chain may be laid along the sea bed without a set anchor so as to apply little or no tension on the boat and anchor. Ordinarily this is not as dangerous as anchor dragging, but wind and currents can cause the boat to drift.

From this simplified description of a set anchoring operation it will be clear to those practicing the art that it is important for multiple crew members to monitor the water depth, the length and rate of anchor rode released, the speed of a boat, and the distance of boat from a selected anchor site throughout an anchoring operation. However, no devices and/or methods operable to effectuate these functions simultaneously have been available.

Many boats have a simple sonar sensor embedded in the boat hull to monitor water depth. Sonar sensors are required to ensure that the boat does not suffer damage when navigating shallow waters.

Global Navigation Satellite Systems (GNSS) chart plotters, that are commonly found on sea faring boats, have built in mapping capabilities. These instruments can overlay the current position of the boat on navigation charts and track boat speed. GNSS chart plotter manufacturers such as Raymarine (http://www.raymarine.com, retrieved on Feb. 23, 2021), can trigger an alarm when the boat position exceeds a predetermined distance from a selected location. These devices can track a boat position as the boat swings through an arc 205 defined by the rode 125 and anchor site 120 as shown in FIG. 2. There are smartphone applications such as Aqua Map having similar functionality (http://www.globalaquamaps.com/Anchor_Alarm.html, retrieved on Feb. 23, 2021).

Prior art techniques to measure chain length during the course of a set anchor operation include counting periodic marks either painted on or attached to equally spaced rode chain links. Maintenance requires a crew to stretch the rode along the boat deck and paint chain links at regular intervals along its length. Alternatively, crew may attach plastic clips to chain link at equal intervals along the rode length. By counting the number of marked links as the rode is released a crew may estimate released rode length. In practice, crew members are easily distracted during an anchoring operation and can easily lose count. Apart being error prone, the markings themselves are problematic. Paint weathers and fades when exposed to the elements and corrosive environment of the sea. Chain links grind against the seabed or each other during use and/or storage. In real world environments the paint quickly wears off, making link counting difficult. Plastic clips wear at least as quickly, frequently breaking in either the chain locker (cabinet where the rode is stored) or as the rode passes through the WL gypsy. For these, and other reasons, counting marked links is a technique rarely used in real world anchoring applications.

New boats smaller than 30 meters in length, seldom have chain counters. However, retrofit WL chain counters are available from a number of manufacturers. Retrofit chain counters such as described in U.S. Pat. No. 6,374,765, use an attached magnet to sense a WL revolution each time the magnet traverses a sensor. Installation of these devices is intrusive, difficult, and laborious. Besides challenges associated with disassembling the WL and mounting the retrofit chain counter, a magnet must be epoxied into a hole in the gypsy and a sensor must be a recess in the base of the WL before the WL is re-assembled and reattached to the deck of a boat. Installation also requires cables be run to the boat's electric breaker panels and addition of cockpit and mounting display hardware in the cockpit. These chain counters must be calibrated by manually measuring the length of rode released in proportion to the number of WL revolutions.

A prior smart phone art application, "Anchor Chain Counter App", purported to measure rode release based on receiving sound patterns emanating from a WL with the smartphone microphone. It was reported to have been offered on the online Google Play Store before being removed. (https://www.cruisersforum.com/forums/f118/anchor-chain-counter-smartphone-app-157394.html, dated May 12, 2015 retrieved on Feb. 23, 2021, https://m.apkpure.com/anchor-chain-counter/com.berndbrinkmann.counter retrieved on Mar. 28, 2021). However, the application could not measure any chain length reliably, or distinguish between chain release and retrieval.

Accordingly, it can be seen that there has been a long felt need for low cost methods and devices to effectuate reliable and secure anchoring of a boat by monitoring the length and rate of rode release, water depth at the anchoring site, boat velocity, and the distance between a boat and an anchoring site in real time.

SUMMARY

Methods and apparatus for sensing and measuring real time changes in angular rotation of a windlass (WL), the rate and length of anchor rode release, boat speed, and boat position during a boat anchoring operation are described. A relationship between the length and/or incremental rate of anchor rode release, boat speed and/or distance from an anchoring site can be automatically evaluated, and critical values of the relationship can be used trigger an alarm condition. Various anchoring parameters and/or alarms can be displayed in a user interface and sent over a wireless network and displayed to a plurality of remote crew members having networked computing devices.

More particularly, specific embodiments of methods and apparatus for determining a length of rode traversing a gypsy of a windlass in real time during an anchoring operation are disclosed.

There is a windlass module operable to be attached to a windlass wherein the windlass module comprises means for sensing a signed incremental angle of windlass rotation between a prior and a current angular position of the windlass, the windlass module further comprising means for wirelessly sending the signed real time incremental rotation angle to a remote computing device in real time. The windlass module can have a baseplate configured with a specialized keyshaft that can engage a standard windlass winch handle socket (commonly found at the center of windlasses, see FIG. 3 and FIG. 5) to attach the module to the windlass securely in a fixed position.

In various aspects, the windlass module can have a transmitter operable to emit directional radiation selected from the group consisting of directional sound and directional electromagnetic radiation. The directional radiation can be pulsed. In some embodiments, the radiation comprises pulses that include a characteristic pattern operable to discriminate against background noise. The transmitter of directional electromagnetic radiation can be a light emitting diode, a laser, a radio wave emitting device, a source of microwave radiation, or a source of terahertz radiation.

In various embodiments, The windlass module has a directional receiver selected from the group consisting of a directional microphone and a directional electromagnetic radiation receiver. The directional electromagnetic radiation receiver can include a component selected from among the group consisting of a solid state photodetector, a radiofrequency detector, a microwave radiation detector, and a terahertz radiation detector.

There is a method based on accumulating a sum of incremental rotation angles of a windlass in real time with a computer comprising capturing digital images of the windlass that have a trackable feature on the uppermost surface at early and later times. The digital images are saved in a computer memory. This method includes a step of sensing a respectively early and a later angular position of the trackable feature in the early and later digital images, using a computer vision algorithm. It also includes a step of detecting a difference between the later and the early angular positions of the trackable feature on the windlass in real time with a computer, where the said difference between the positions is a signed incremental rotation angle. Furthermore, the method includes adding the signed incremental rotation angle to the sum of incremental rotation angles; and multiplying the sum of incremental rotation angles by a calibration factor defining a proportionality between a length of rode release and windlass rotation angle.

In an aspect of the method, the length of rode release is a total length of rode that has been released and/or gathered during an entire anchoring operation. In another aspect, the digital images are captured with a camera having a digital image sensor. A further aspect comprises a step of providing the trackable feature on a visible upper surface fixed to the windlass, where the trackable feature is selected from among a marking, material adhering to the visible upper surface forming a pattern, a light emitting device, an area of the upper surface having alphanumeric characters, and an area of the upper surface having distinct contrast. A still further aspect has steps operable to determine the calibration factor.

An embodiment of steps operable to determine the calibration factor comprises supporting the digital camera in a position where a field of view of the camera encloses a windlass capstan and a portion of a rode chain emerging from the windlass, and providing a software having an user interface. The application having the user interface is operable to show digital camera video images from the camera in real time on a touch screen display, and superimpose a center alignment marking for windlass capstan and a central alignment marking for the rode chain on the touch screen display showing digital camera video images of the capstan and emerging rode chain. The user interface is further operable to receive user gestures for positioning and/or scaling the center alignment marking for the windlass capstan onto a center of the windlass capstan in the digital camera video images. The user interface is also operable to receive user gestures for positioning and/or scaling the central alignment marking for the emerging rode chain onto a midline of the emerging rode chain in the digital camera video images. Furthermore, the method comprises computing an effective windlass gypsy diameter based on the positioning and/or scaling of the center and central alignment markings.

Another aspect of the above method is based on accumulating a sum of incremental rotation angles and includes performing the capturing, the sensing, the detecting a difference, the adding, and the multiplying with a mobile computing device comprising a digital camera, tangible media operable to store data and instructions, a processor, a touch-sensitive display screen, an speaker, and a wireless network communication interface. The mobile computing device is selected from among a smartphone, a tablet computing device, and a portable computer.

There is also a method of determining a length of rode chain traversing a gypsy of a windlass and emerging from the windlass in real time during an anchoring operation disclosed. The method comprises providing a number of rode chain links in a unit length of the rode chain, supporting a digital camera in a position where the length of rode chain emerging from the windlass is within the field of view of the digital camera, capturing a sequence of digital video images from the digital camera, and saving the digital video images of the sequence in computer memory, and analyzing each digital video image in relation to previous digital video image(s) of the sequence. The method is performed with a computer having instructions and data operable to perform an optical flow analysis algorithm useful to detect a number of chain links passing through the field of view. This method further comprises performing computer instructions operable to divide the number of chain links passing through the field of view by the number of chain links per unit length of the rode chain.

This disclosure also provides computer readable tangible media having stored data and instructions for a mobile computing device to perform steps operable to measure a length of rode traversing a windlass gypsy of a boat and a rate of rode being released and/or gathered by the windlass gypsy in a boat anchoring operation. The steps comprise capturing an early and a later digital image of the windlass at respectively early and later times using a digital camera, and saving the early and later digital camera images in a computer memory. The steps further comprise sensing an early and a later angular position of a trackable feature on the windlass in the respective early and later digital images with a computer vision algorithm, and detecting a difference between the later and the early angular positions of the trackable feature on the windlass in real time using a computer. The difference between the positions is a signed incremental rotation angle. There are still further steps including adding the signed incremental rotation angle to the sum of incremental rotation angles, and multiplying the sum of incremental rotation angles by a calibration factor defining a length of rode that is released proportionate to an angle of windlass rotation.

An aspect of the aforementioned computer readable tangible media further comprises stored data and instructions operable for a processor of the mobile computing device to perform further steps operable to determine the calibration factor. The further steps comprise providing user notification operable to direct a user to support a digital camera in a position wherein video images from the digital camera comprise the windlass capstan and a portion of a rode chain emerging from the windlass. There are further steps of displaying the digital images comprising the windlass capstan and a portion of a rode chain emerging from the windlass in a screen display, superimposing alignment markings on the windlass capstan and rode chain in the screen display, receiving user input operable to move and/or scale the superimposed alignment markings wherein a first alignment marking is positioned at the center of the windlass capstan and a second alignment marking is centered in the emerging rode chain in the screen display, and computing an effective windlass gypsy diameter based on the positioning and/or scaling of the first and the second alignment markings. There is also an embodiment of this aspect of the computer readable tangible media where the screen display is a touch screen display and user input comprises gestures on the touch screen display.

Another embodiment of the tangible media above further comprises stored data and instructions operable for a processor of the mobile computing device to acquire real time boat location coordinates from real time position sensing means embedded in the mobile computing device. The data and instructions are also operable to determine a real time speed of the boat based on the boat location coordinates, determine a real time total distance of the boat from an anchor site based on the acquired boat location coordinates, display first information comprising a comparison of the boat speed to the rate of rode being released in real time in a human interface of the screen display, determine a real time total length of rode released from the boat based on the product of the calibration factor and the sum of the incremental rotation angles, display second information comprising a comparison of the total length of rode released from the boat to the total distance of the boat from the anchor site in real time in a human interface of the screen display, and send the first and/or second information over a wireless network to a remote computing device. By these steps, a remote helmsperson, skipper, and/or crew member having the remote computing device can receive the first and second information in real time. These further data and instructions are also operable to evaluate a relationship comprising one or more parameters selected from among the real time values of boat speed, the rate of rode being released, the total length of rode released from the boat, and the total distance of the boat from the anchor site, and compare the value of the predetermined relationship to a predetermined alarm limit value. If the alarm limit value is exceeded, the data and instructions are operable to provide a visual and/or audible alarm on the mobile device, and send a signal and/or data over the wireless network to a remote mobile device. The remote mobile device has remote data and remote instructions operable to receive the signal and/or data over the wireless network and to effectuate a remote visual and/or audible alarm for a remote helmsperson, skipper, and/or crew member having that device.

In another embodiment, computer readable tangible media further comprises the remote data and remote instructions operable for the remote mobile device to receive the signal and/or data sent over the wireless network and effectuate the remote visual and/or audible alarm.

In a still further embodiment, there is computer readable tangible media having data and instructions operable to be performed in a mobile computing device comprising the camera, tangible media operable to store the data and instructions, a processor, a touch-sensitive display screen, a speaker, and a wireless network interface controller, where a mobile computing device can be a smartphone, a tablet computing device, and/a portable computer.

This disclosure also describes a method of accumulating a sum of incremental angles of windlass rotation to determine a length of rode traversing a gypsy of a windlass in an anchoring operation based on receiving a plurality of samples of a sound field in a directional microphone fixed to the windlass, and storing a digital representation of each sound sample in tangible media. The method includes steps of detecting a pattern characteristic of a difference between a later and an early angular position of the windlass in the digital representations of the samples, and extracting a signed incremental rotation angle of the windlass from the sound sample based on detecting the pattern. The signed incremental rotation angle is added to a sum of signed incremental rotation angles, and the sum is multiplied by a calibration factor defining a length of rode that is released proportionate to an angle of windlass rotation.

There is a further aspect of the directional microphone method that includes receiving a plurality of samples of a sound field in an omnidirectional microphone fixed to a central position of the windlass, and using the sound samples from the omnidirectional microphone to suppress omnidirectional background sound and/or improve the pattern detection.

Another aspect of the disclosure is tangible media comprising instructions and data operable for a computer to perform the steps for measuring a length of rode traversing a windlass gypsy and a rate of rode being released and/or gathered by the windlass gypsy in an anchoring operation, including steps of receiving a plurality of samples of a sound field with a directional microphone fixed on the windlass, and storing a digital representation of each directional microphone sound field sample in tangible media. The instructions and data are further operable to perform steps of detecting a pattern characteristic of a difference between a later and an early angular position of the windlass in the digital representations of the plurality of sound field samples from the directional microphone, and extracting a signed incremental rotation angle of the windlass based on the characteristic pattern detected. The instructions and data can also perform the steps of adding the signed incremental rotation angle to a sum of signed incremental rotation angles, and multiplying the sum of the signed incremental rotation angles by a calibration factor defining a length of rode that is released proportionate to an angle of windlass rotation.

Other tangible media comprises operable instructions and data for a processor to perform steps for capturing a plurality of digital images using an image sensor, performing a computer vision algorithm operable to extract an amount and rate of angular rotation of a windlass from the digital images, and determining a length and rate of rode release based on the rate and the amount of angular rotation.

An aspect of the written description discloses tangible media comprising anchoring data and instructions operable for a local mobile computing device to measure a real time rate and length of rode traversing a windlass, where the local mobile computing device includes a processor, tangible media operable to store data and instructions, a digital camera operable to capture digital images of the windlass in real time, a touch-sensitive display screen, a speaker, and a wireless network communication interface. The anchoring data and instructions are operable for the processor to determine real time information including a length of rode release and a rate of rode release using the captured digital images of the windlass to sense an amount of angular rotation. The anchoring data and instructions are further operable to communicate the real time information from the local mobile computing device to a remote crew member by sending the real time information from the local mobile computing device over a wireless network to a remote mobile computing device. The remote crew member receives the information from the remote mobile computing device. In an embodiment, the mobile device is selected from among a smartphone, a tablet computing device, and a portable computer.

This disclosure describes means for using a computing device selected from the group consisting of a smartphone comprising a digital camera and a tablet computer comprising a digital camera to measure a length of rode release from a windlass in real time, wherein the length of rode traveling through the windlass is proportional to angular rotation of the windlass.

In a further aspect of the disclosure, there is an apparatus operable for a crew member to use to measure a rate and length of chain length moving through a windlass of a boat. The apparatus comprises a processor and a camera operable to capture sequential digital images of a distinguishable rotatable portion of the windlass wherein the sequential images include information operable for a processor to perform steps for determining an angular velocity of a portion of the windlass. The apparatus also has a network interface controller and machine readable tangible media. The machine readable tangible media comprises data and instructions operable for a processor to perform steps for determining a real time length of rode chain release and a real time rate of rode chain release, based on a sequence of digital video images selected from the group consisting of digital video images comprising an upper surface of a windless, and digital video images comprising a windlass gypsy and chain links emerging the windlass gypsy. The data and instructions are further operable to perform steps for determining a boat location and using the boat location to find a real time speed of the boat and distance of the boat from an anchoring site. The data and instructions are operable to compare a value of the real time rate of the real time speed of the boat to a value of the real time rode chain release and send an alarm if the ratio of these values exceeds a predetermined threshold alarm value.

Apparatus including a windlass module operable to be attached to a windlass is also disclosed. The windlass module comprises means for sensing a signed incremental angle of windlass rotation between a prior and a current angular position of the windlass. The windlass module further comprises means for wirelessly sending the signed real time incremental rotation angle to a remote computing device in real time.

In a further aspect, the windlass module comprises a baseplate having keyshaft means for attaching the windlass module to the windlass in a fixed position using a winch handle socket of the windlass. In a yet further aspect, the windlass module means for sensing the signed incremental angle of windlass rotation between a prior and a current angular position of the windlass comprises a transmitter operable to emit directional radiation selected from the group consisting of sound and electromagnetic radiation. In some embodiments, the windlass module the directional radiation comprises pulses. There are also embodiments where the directional radiation pulses comprise a characteristic pattern operable to discriminate against background noise. Furthermore, there are embodiments wherein the transmitter of directional electromagnetic radiation includes a component selected from among the group consisting of a light emitting diode, a laser, a radio wave emitting device, a source of microwave radiation, and a source of terahertz radiation.

In additional aspects, the means for sensing the signed incremental angle of windlass rotation between a prior and a current angular position of the windlass used by the windlass module comprises a directional receiver selected from the group consisting of a directional microphone and a directional electromagnetic radiation receiver. There are embodiments where the directional electromagnetic radiation receiver comprises a component selected from the group consisting of a solid state photodetector, a radiofrequency detector, a microwave radiation detector, and a terahertz radiation detector.

BRIEF DESCRIPTION OF DRAWINGS

Various embodiments are illustrated in an exemplary manner by the accompanying drawings. The drawings and accompanying description should be understood to explain principles of the embodiments rather than be limiting. Other embodiments will become apparent from the description and the drawings:

FIG. 14A shows a diagram showing the cross section of a standard 8-pointed star winch handle socket.

FIG. 14B shows alternative cross sections of a keyshaft in various embodiments.

FIG. 14C is a simplified diagram showing an embodiment of a WL having a sensor module.

DETAILED DESCRIPTION

Figure 1:
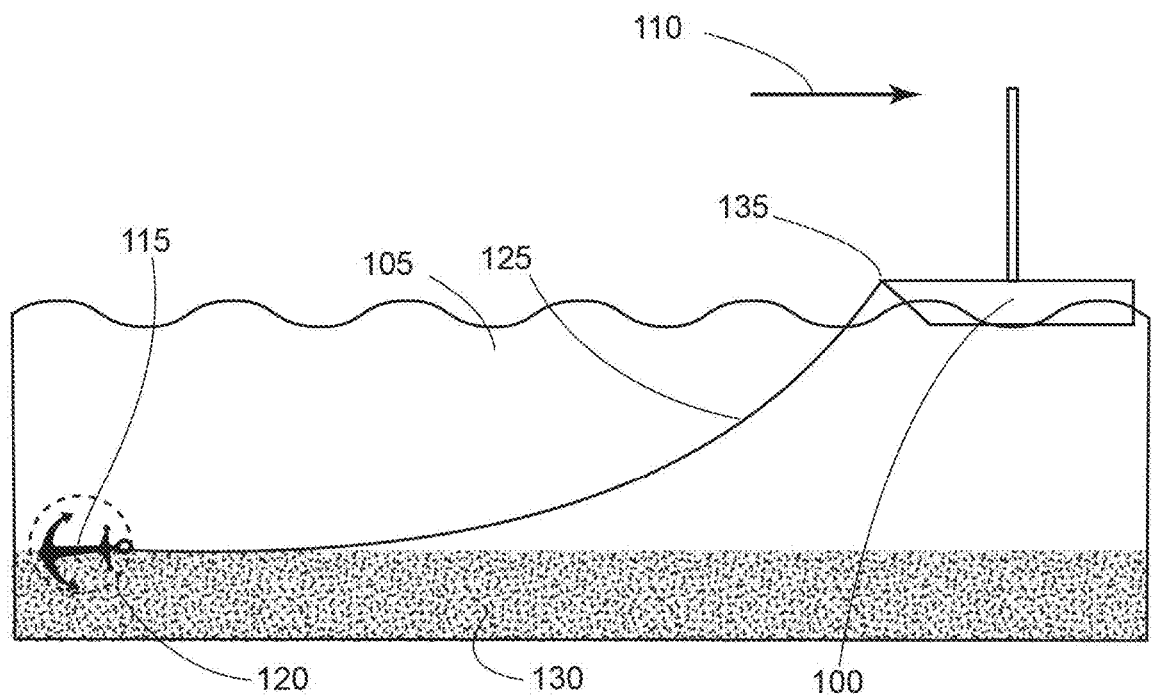
FIG. 1 shows a boat anchored to a seabed.
Figure 2:
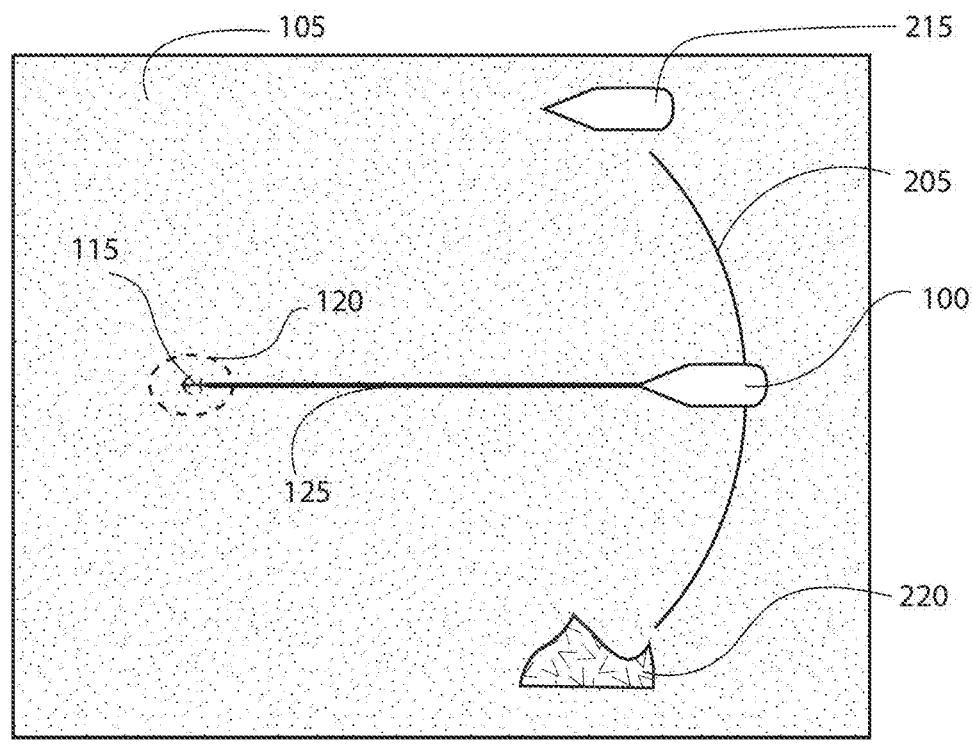
FIG. 2 shows an anchored boat swing after anchor set.
Figure 3:
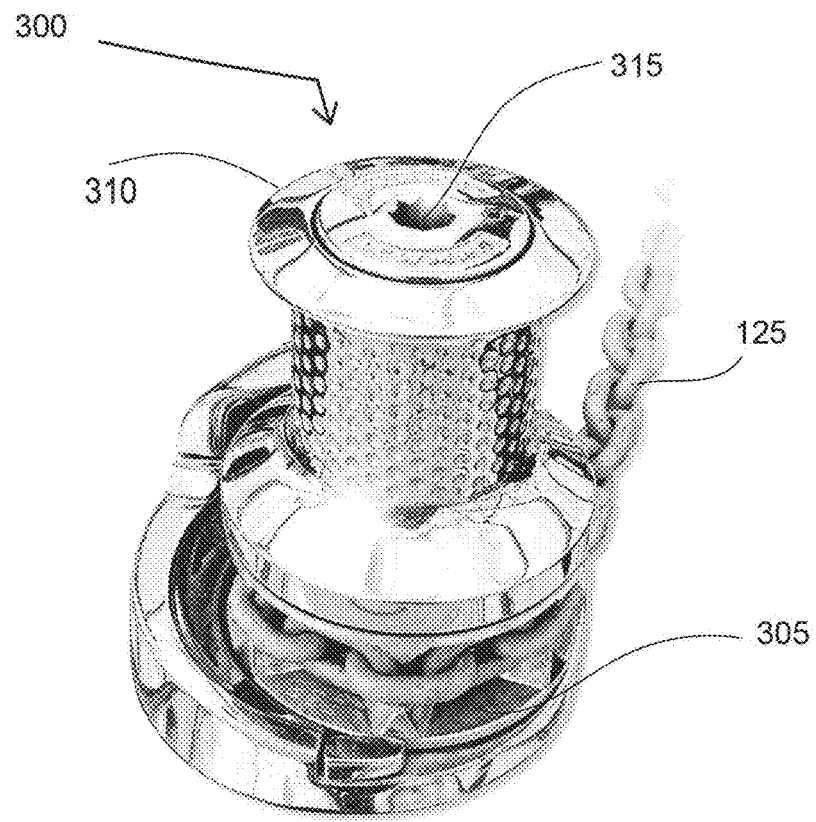
FIG. 3 shows an image of a standard vertical WL and its main components.
Figure 4:
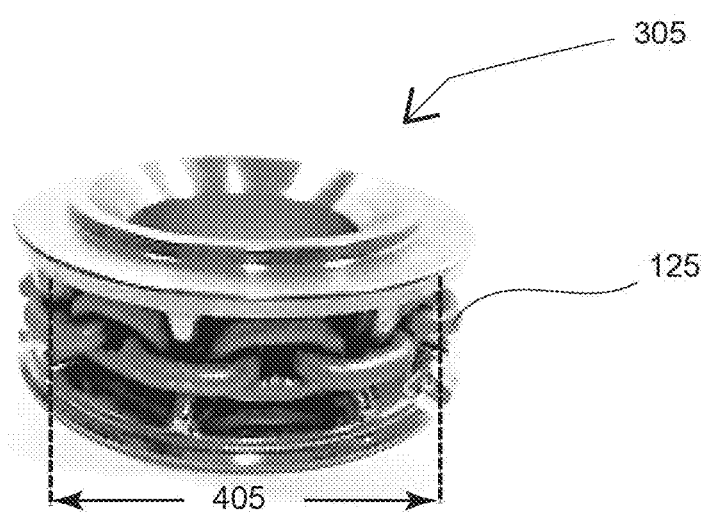
FIG. 4 shows an image of a WL gypsy with anchor rode.
Figure 5:
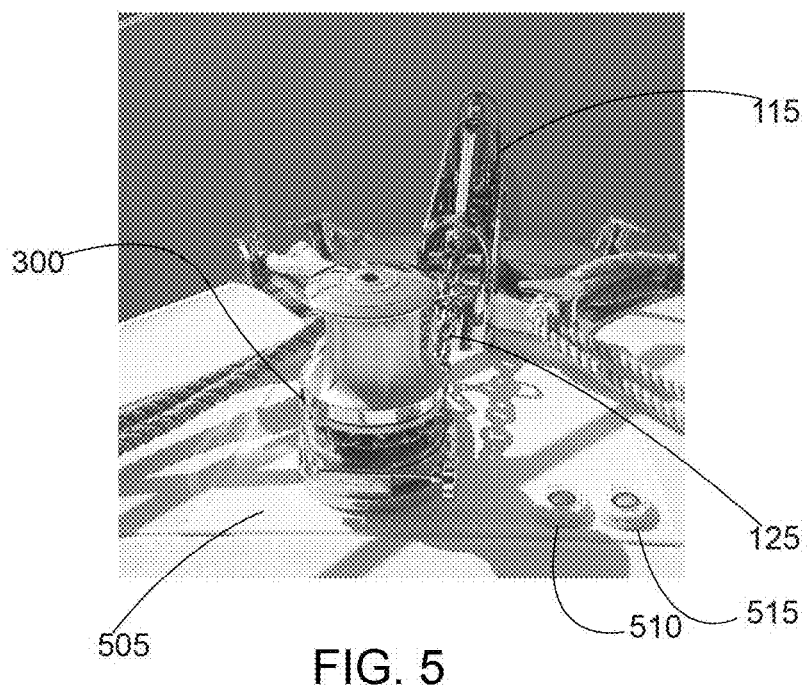
FIG. 5 shows a vertical WL mounted on a bow deck of a boat.
Figure 6:
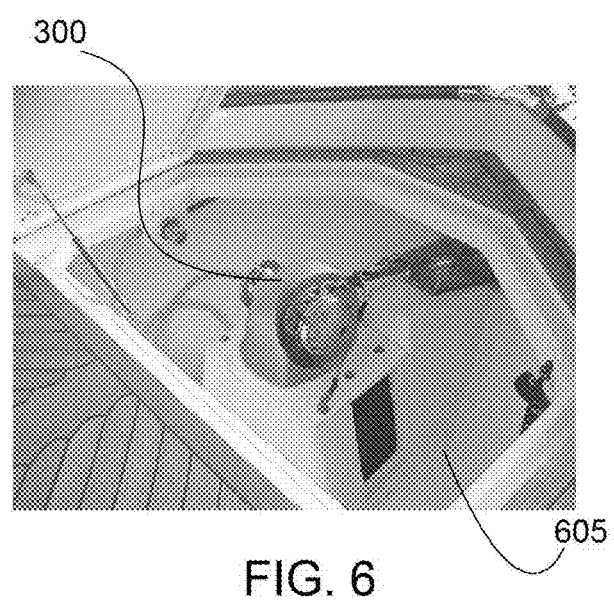
FIG. 6 shows a horizontal WL in storage cabinet of a boat.
Figure 7:
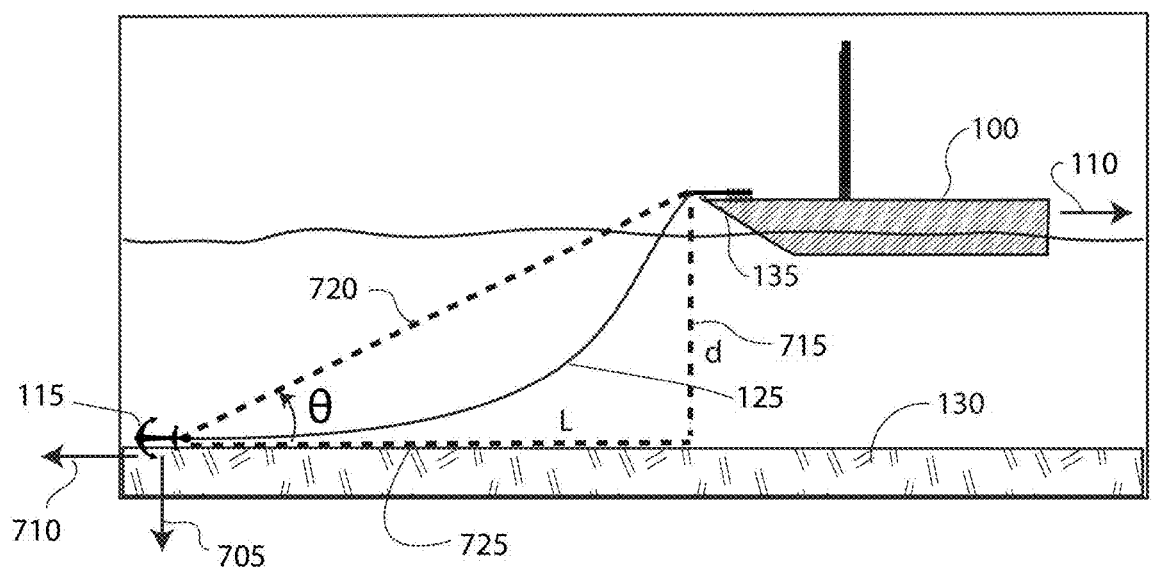
FIG. 7 is a simplified diagram of rode and boat movements when anchoring.

Novel methods and apparatus are disclosed that provide improved ability to anchor a boat reliably and securely. In various embodiments, real time values of the rate of rode release, and the length of rode that has been cumulatively released are measured and/or monitored using various methods and simple low-cost equipment disclosed herein. The rate of rode release and the cumulative length of rode released in combination with real time values of boat velocity, trajectory, and rode status displayed enable crew members to perform safe anchoring.

In an aspect of this disclosure, methods and apparatus to determine the length and rate of rode release depend on a series of real time video images of a WL captured with a digital camera. The angle of rotation and angular velocity of the WL are extracted in real time by machine vision algorithms in a computer application program.

In another aspect, angular motion, e.g. an angle of rotation and/or angular velocity, of a WL is measured using sensors responsive to forces and/or motion. In still further aspects, the rotation of a WL and the length and rate at which anchor rode is being released are extracted from sound received by a microphone attached to a WL.

In still further aspects, a disclosed method depends on a machine vision technique known as optical flow analysis. This method can determine a length and/or rate of anchor rode release. In the method an optical flow analysis of sequential images of the rode (rode image data) acquired with a digital camera does not require determining the WL rotation or WL rotation angle. Some embodiments of the method can be self-calibrating. However, a method of optical flow analysis can also include steps for determining a calibration relationship.

Parameters describing the rotation of a WL include the angular velocity of the WL, the rate at which rode traversing the gypsy of the WL is being released or gathered, and the cumulative algebraic total length of rode that has traversed the gypsy during a selected interval of time. Various methods operable to determine values of these parameters are disclosed. Generally, these methods depend on establishing a predetermined relationship (calibration factor) relating a length of anchor rode (X) that has travelled through the gypsy of a WL to an angle (Ø) of WL rotation. In a number of embodiments, the calibration factor can be found using augmented reality in a computer display user interface. In some further embodiments, a calibration relationship can be based on characteristic manufacturer's data in a database, and/or prior calibration(s) of the same WL and rode, or same type of WL and rode, found in a database.

The terminology herein is for the purpose of describing particular embodiments and is not intended to be limiting of the disclosures. It will be understood that, although the terms first, second, etc. may be used to describe various elements, these terms are only used to distinguish one element from another, and the elements should not be limited by these terms. For example, a first element could be termed a second element, and similarly a second element could be termed a first element, without departing from the scope of the instant description. As used herein, the singular forms "a", "an" and "the" are intended to include the plural forms as well, unless the context clearly indicates otherwise. It will be further understood that the terms "comprises," "comprising," "includes," "including," and/or "having," as used herein, are open-ended terms of art that signify the presence of stated features, integers, steps, operations, elements, and/or components, but do not preclude the presence or addition of one or more other features, integers, steps, operations, elements, components, and/or groups thereof. Reference in the specification to "one embodiment", "an embodiment", or some embodiment, etc. means that a particular feature, structure, or characteristic described in connection with the embodiment is included in at least one embodiment. The appearances of the phrase "in one embodiment" in various places in the specification are not necessarily all referring to the same embodiment, nor are separate or alternative embodiments mutually exclusive of other embodiments.

As used here, various terms denoting spatial position such as above, below, upper, lower, top, bottom, leftmost, rightmost and the like are to be understood in a relative sense. The various aspects of the apparatuses described herein are operable without regard to the spatial orientation of the apparatuses as a whole. For example, an apparatus can be configured in a vertical orientation or in a horizontal orientation. Hence a component or module that is described as being above another component or module in a first embodiment having a first orientation, could equivalently be described as being to the left of the other component or module in an equivalent second embodiment configured to be in a second orientation 90 degrees counterclockwise with respect to the first.

The term module refers to a distinct unit that is operable to perform an identifiable function. A module can be a self-contained physical unit or piece of equipment. A module can also be a logical component effectuated by a processor and tangible media having instructions and/or data that are operable for the processor to perform the identifiable function. The term automatic refers to a module, service, or control system that is operable to perform without human interaction.

Angular position means the value of an angle, which in conjunction with a radius value, defines a location in a polar coordinate system. A counterclockwise sense of angular rotation is understood to increase the angle (effectuate a positive change in angular position) and a clockwise angular rotation to reduce the angle (effectuate a negative change in angular position), unless stated otherwise. An angle of rotation is increased by 360 degrees ($2\pi$ radians) for each full revolution in the positive sense, or decreased by 360 degrees for each revolution in the negative sense.

A WL refers to a mechanical assembly used to release or retract anchoring rode on a boat whereby an anchor can be set or withdrawn. Generally, a WL comprises a distinct generally circular uppermost portion termed a capstan. A WL also comprises a gypsy that engages anchoring rode as it traverses the WL. Gypsy diameter ($D_G$) refers to the linear distance along a diameter drawn from one midpoint where a taut rode is in contact with the gypsy through the center of WL gypsy rotation to an opposing midpoint where the rode is in contact with the gypsy. Effective $D_G$ means the diameter providing the length of a rode traversing a gypsy when multiplied by an angle of rotation $\varnothing$, where $\varnothing$ is measured in radians ($2\pi \times degrees/360$). Incremental WL rotation angle ($\Delta\varnothing_{INCR}$) refers to the difference in angle of a WL during the course of rotation around its axis. Incremental rode length ($\Delta X_{INCR}$) is the signed quantity of rode traversing the gypsy calculated using $D_G$ and $\Delta\varnothing$ measured during a measurement time interval $\Delta t$ during the anchoring operation, where $\Delta X_{INCR} = \Delta\varnothing * D_G / 2$. Total rode length $X_{TOT}$ (at a given point in time) is the total length of rode extending from the WL to the anchor location, and $X_{TOT} = \Sigma \Delta X_{INCR}$. The rate of rode release (where $\Delta X_{INCR}$ is a positive number) or gathering (where $\Delta X_{INCR}$ is a negative number) is calculated as $\Delta X_{INCR}/\Delta t$. The "boat distance" (from anchor location) is the horizontal linear distance between a point where a line perpendicular to the set anchor intersects the water surface and the bow of the boat at the waterline.

A windlass rotation angle will be understood to mean the angular amount of a windlass rotation around the center of the windlass with reference to a concentric polar coordinate system.

A signed quantity will be understood to mean a quantity that can be positive or negative. For example, a positive length of rode is a length of rode that has emerged from a windlass of a boat, usually going into a body of water. Rode is generally released (moved) by the gypsy of a windlass. A negative length of rode is a length of rode that is drawn into the windlass, usually gathered from a body of water.

A sum will be understood to mean an algebraic total formed by the addition of individual amounts of a quantity where each of the amounts can be a positive or negative signed quantity. For example, where rotation can be in a positive or negative sense, a sum of incremental angles of rotation means the algebraic total amount of rotation defined by an algebraic addition of positive incremental angles and negative incremental angles to find an algebraic total angle of rotation.

The term computer will be understood to mean a processing system that includes a processor and tangible memory, wherein the memory is operable to store data and instructions, and the processor is operable to perform the instructions and operate on the data.

The term "tangible" as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Augmented reality refers to a human-computer interface comprising superposition of computer-generated image layers and an image of a real physical object. The term digital camera refers to a camera that can capture an image in a digital form (digital image). A digital video refers to a periodic series of digital images (each image can be referred to as a frame).

The term radiation means acoustic and/or electromagnetic energy radiated or transmitted in the form of waves including sound vibrations transmitted through an elastic medium and electromagnetic waves such as infrared, visible and ultraviolet light, radio waves, microwaves, and terahertz waves.

In a number of embodiments, various apparatus and methods are disclosed to measure angular movement of WL rotations and the rate of rode released and/or gathered by the WL gypsy based on imaging of the WL rotation. A system for imaging can include a digital image sensor (for example the image sensor in a smartphone camera, or an electronic image sensing array in a stand-alone camera) to capture the images of a rotating WL during anchoring operation and a processor to analyze these images in real time to provide feedback to crew members of a boat. Augmented reality and computer vision algorithms can be used to enhance various aspects of these measurements as well as for the analysis of sequential WL images in the following sections.

In a number of embodiments, various specialized software applications running on a computing mobile device receive the raw measurement data in the form of video frames, audio signals and/or MEMS sensor data, apply the necessary computational algorithms and display the results to crew members. Such commercial mobile devices can include smartphones, tablet computers ("tablets"), portable personal computers, smartwatches, and smart glasses. The current capabilities of smartphones and tablets are generally sufficient to capture audio-video frames, analyze video images and detect a distinguishable marking and/or repeated pattern therein, compute values of parameters that are essential for anchoring, and display textual and graphical information such as rode release data, all in real time. Furthermore, many of these mobile devices include embedded accelerometers, gyroscopes, multiple cameras, multiple microphones, and magnetometers that can be accessible via Application Programming Interfaces (APIs). While there are smartwatches that include cameras, current smartwatch products are not suitable to analyze video frames using Computer Vision (CV) algorithms in real time, owing to relatively limited computational speed and memory. However, this situation may change in the future as computation capabilities, miniaturization, and energy efficiency evolve.

Generally marine vessels can range from 6-meter recreational power boats through 350-meter aircraft carriers and can be powered by nuclear propulsion, internal combustion engines and/or wind. All marine vessels require reliable and accurate methods for measuring rode length during the course of anchor operations. Some of these large commercial or military marine vessels may employ mechanical and/or electromechanical chain counters to measure the rode length. Regardless of the size or types of the marine vessels, all marine vessels will benefit from the anchoring methods disclosed herein.

Although most examples of anchoring devices and methods described herein relate to vertical windlasses having axes of rotation perpendicular to the boat deck, the instant teachings are also effectuated for horizontal windlasses.

In various embodiments, instant methods disclosed herein rely on measuring incremental WL rotation angles, $\Delta\varnothing_{INCR}$, and WL gypsy diameter, $D_G$, to compute rode length, $\Delta X_{INCR}$. Generally, gypsies are sold by WL manufacturers matched to a specific WL and chain (or rope) combination complying with existing International and USA Standards for windlasses and chains. However, in some circumstances manufacturer data sheets or archival values for $D_G$ may not be readily available to a crew during anchoring. It is critical to have a practical and convenient method of measuring an effective gypsy diameter of a WL.

A novel method of determining the length of anchor chain released or gathered depends on calibrating the length of chain release X traversing the gypsy as a function of WL rotation angle Ø and monitoring the angular WL rotation during an anchoring operation. In some embodiments, specific WL dimensions and/or other characteristics, i.e. diameter of a capstan and/or gypsy, characteristic chain link dimensions, etc., can be accessed from manufacturer data and used to calculate a minimum and maximum chain length traversing the gypsy per WL rotation angle. Depending on the embodiment, this calculation can be useful for an actual, a trial and/or a rough calibration.

In various embodiments a correction is made when the camera is above the WL in a position from which the region where chain emerges from the gypsy is partly or wholly blocked by the capstan or structure. To refine the calibration further, lengths of chain are released onto a flat surface and measured (for example on a deck) while monitoring the angle of rotation and/or number of rotations of the WLC. The measured ratio of the length of chain released per amount of angular rotation can be used as a calibration factor to improve accuracy.

A smartphone having a camera and/or tablet with a camera can be used to calibrate chain release per WL rotation. The calibration can be performed in the field with a user interface based using augmented reality. A 3D camera can facilitate the calibration process. A number of commercial smart mobile phones and tablets have built-in 3D cameras and/or means to simulate a 3D camera. In some embodiments, a simulated 3D camera depends on software processing images obtained through intentional camera movement. The 3D camera can acquire an image comprising dimensions of the object to be measured and present image information on a screen. In various embodiments a virtual image layer can comprise a set of points, a line, a circle, and others. A user can align various elements of the virtual layer with the image of an object that is shown on the screen. In this manner a user can identify a characteristic element of an object and effectuate a measurement of an element dimension. More particularly, an effective diameter of a WL gypsy can be identified and measured. Once the effective diameter of the WL gypsy is thus measured with Augmented Reality (AR), a circumference and the length of chain released/gathered per unit angular rotation of the WLC can be computed.

Figure 8:
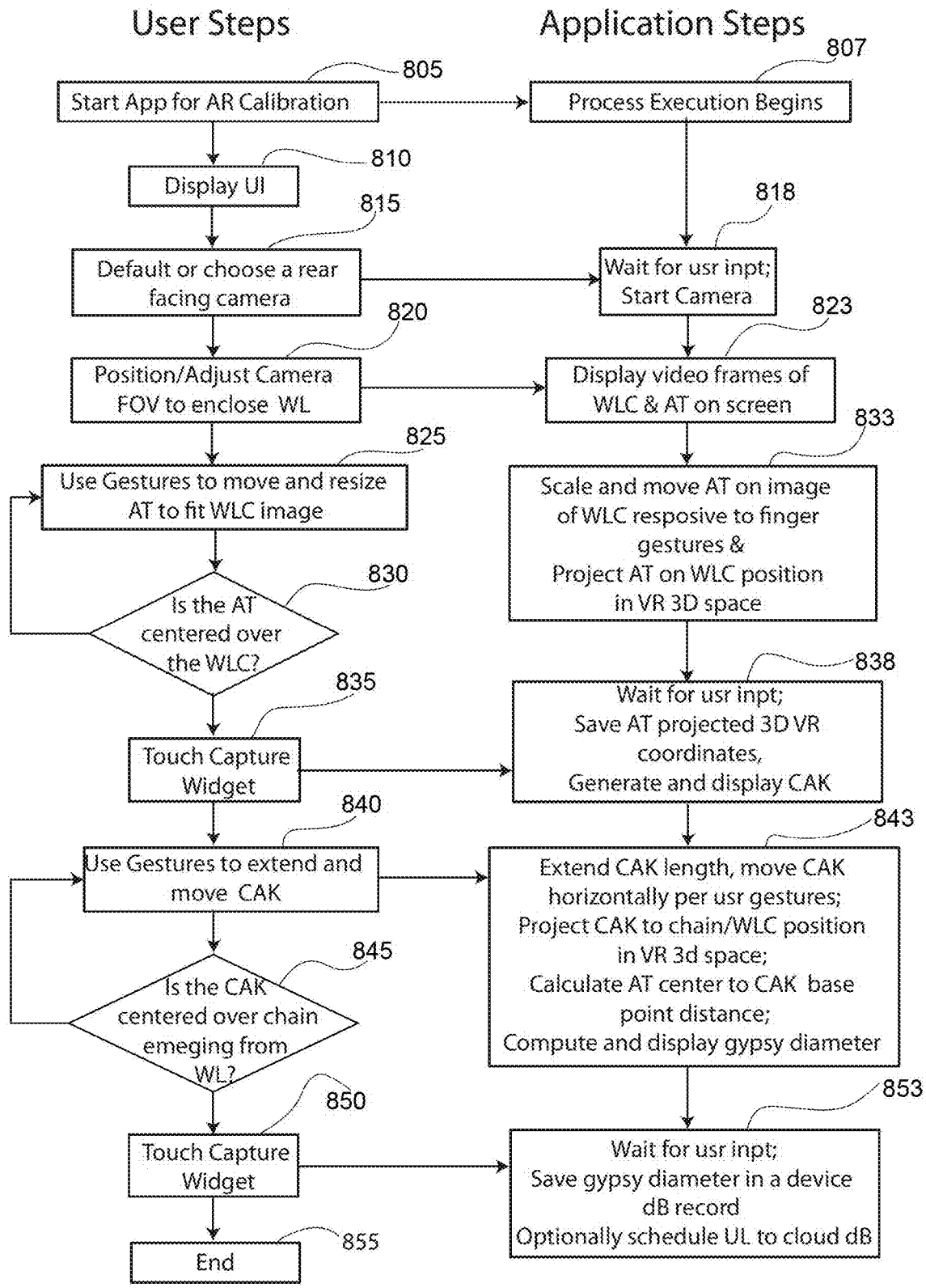
FIG. 8 shows a simplified flowchart illustrating user and application steps of measuring a gypsy diameter using smartphone AR application.
Figure 9:
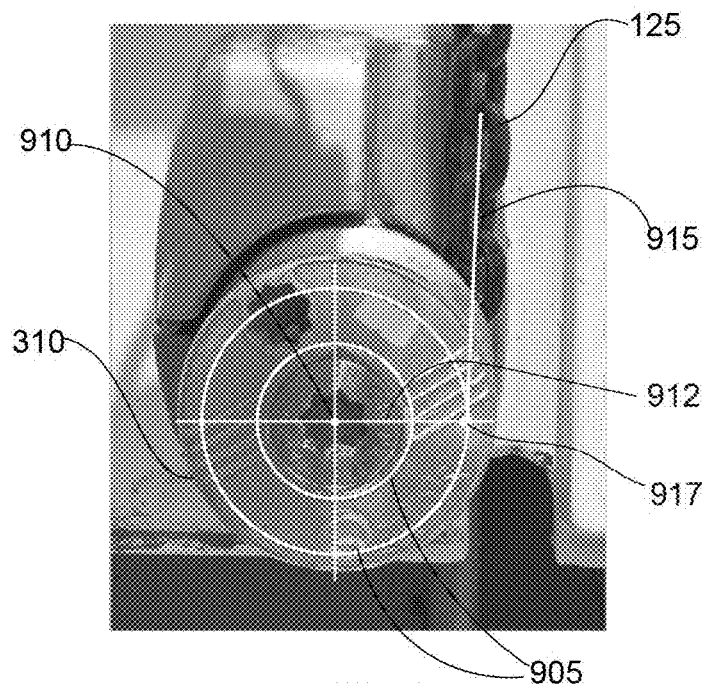
FIG. 9 shows a display including virtual and real objects in a gypsy diameter measurement using smartphone AR applications.

FIG. 8 has a simplified flow chart of a method for measuring an effective gypsy diameter using AR in a mobile device such as a smartphone. At step 805 a user starts an application for AR calibration on a mobile device in FIG. 8, which initiates the execution of the AR application process at step 807. A user interface (UI) display at step 810 can allow the user to choose a default digital camera or a rear facing digital camera, depending upon the embodiment. Upon selecting the camera at step 815 as a user input (usr inpt), the application begins to acquire video frames from the camera at step 818. The WL 300 and chain 125 emerging from the WL seen on the screen is preferably recorded in an orientation wherein the bottom and top of the images in video frames correspond to the bow and stern of a boat (FIG. 9). At step 820, the user can adjust the camera position and orientation to have the field of view (FOV) to enclose both the WL and the portion of the chain emerging from the WL as seen in FIG. 9. At step 823 in FIG. 8 the application displays video frames having the WLC alignment target (AT) 905 superimposed on the WLC, as can be seen on the screen display in FIG. 9. At step 825 the user can use gestures operable to resize and center the AT 905 over the image of the WLC in the video frames. At step 830 the user verifies if the AT is centered 910 over the WLC image as shown by FIG. 9. At step 833 the application can scale and move the AT on the image of the WLC in response to finger gestures, project the AT on the WLC position virtual (VR) 3D space. Upon the user's touch on a capture widget at step 835, the application saves the AT projected 3D VR coordinates, and generates and displays a virtual chain alignment key line (CAK) 915, extending upward from the horizontal diameter target line 912 shown in FIG. 9, at step 838 in FIG. 8. At step 840, the user can use gestures to extend and move the CAK 915 on the display. At step 845, the user verifies the CAK centered over a midline of the chain emerging from the WL. In step 843 responsively, the application code extends the CAK length and moves the CAK 915 horizontally per user gestures, and projects CAK to the chain/WLC position in VR 3D space, calculates the distance between the AT center 910 and the CAK base 917, and then computes and displays the effective gypsy diameter $D_G$. At step 845 the user verifies the CAK centered over the emerging chain from the WL. At step 850 the user touches a widget. Upon receiving user input at step 850, the application saves the effective gypsy diameter $D_G$ in a device database (dB) record and optionally schedule to upload (UL) to cloud dB at step 853. At step 855 the calibration process ends. Once the AT and CAK VR 3D space coordinates are determined, the subsequent calibration process is relatively independent of the camera motions relating to the changing user and/or camera position. The effective $D_G$ obtained from this calibration process can be used by crew members during anchoring operation in various embodiments.

Figure 10:
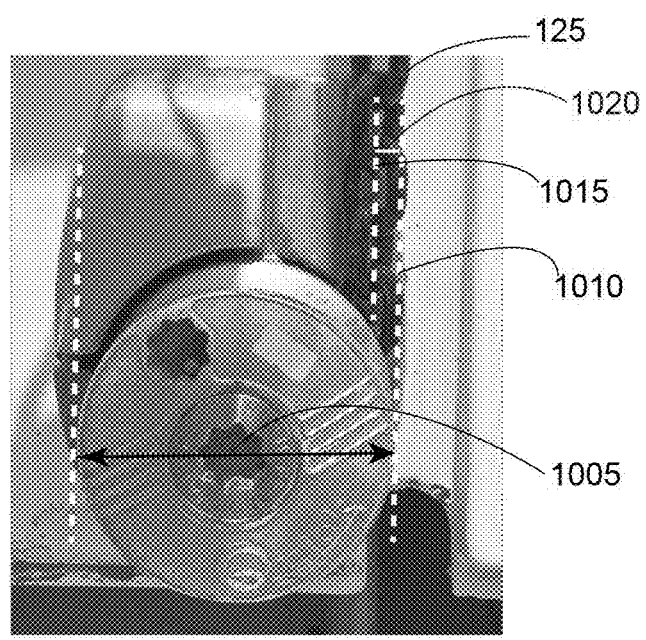
FIG. 10 illustrates a manual gypsy diameter measurement.

Alternatively, an effective gypsy diameter $D_G$ can be measured manually. A crew member measures the outer diameter of the WLC ($D_C$) 1005 using a tape measure and/or ruler in FIG. 10. A ruler depicting a straight edge line 1010 in FIG. 10 is placed tangentially to the outer edge of the WLC near the chain 125 emerging from the WL. The ruler is held parallel to the length of the chain emerging from the WL. Another ruler represented by line 1015 in FIG. 10 is centered along the chain emerging from the WL. The distance between the line 1010 and 1015 ($r_d$ 1020) is measured using a tape measure and/or ruler. $D_G$ is computed from $D_G = D_C - (2 \cdot r_d)$.

The system measuring the angular rotation of a WL includes a digital image sensor, a processor to read and perform computations from serial images of a WL rotation recorded, a machine-readable tangible media to store data and algorithms, and human readable interface. The image sensor can be a smartphone camera, a portable or a dedicated camera.

Figure 11:
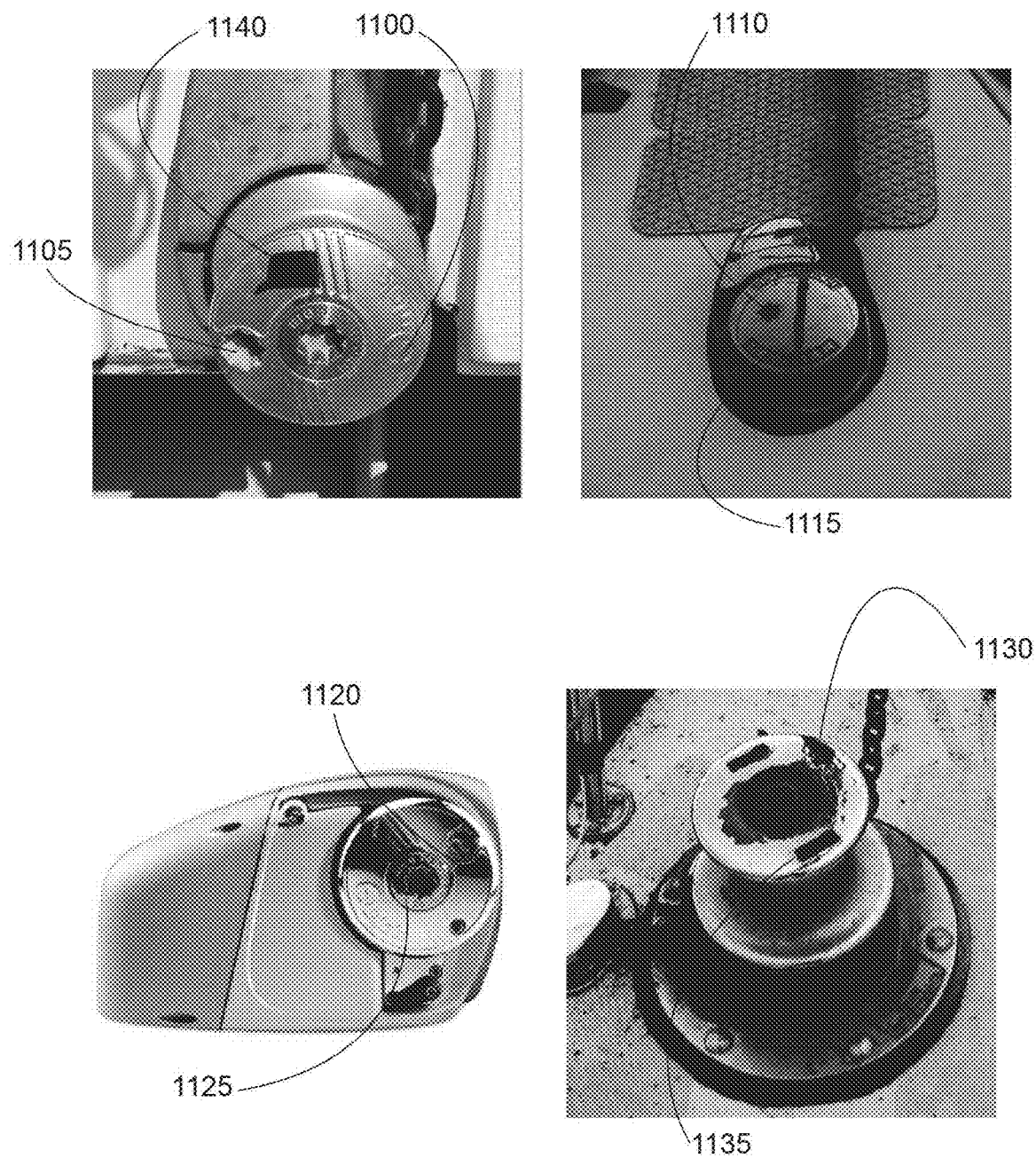
FIG. 11 shows examples of typical WLC markings.

In some embodiments, angular rotation of a WL can be measured by capturing images of the WL using a digital camera, and sensing changes in the angular position of a characteristic feature on the WLC with a computer vision algorithm. FIG. 11 shows examples of common windlasses used for anchoring boats less than about 72 feet long, and some characteristic intrinsic distinguishing markings and features on their capstans. A manufacturer's logo 1100 and/or other localized graphical features 1105, 1110, 1115, 1120, and 1125 are conspicuous. The position of the logo "Quick" 1100 on the WLC can be sensed and used to compute an angular movement and/or velocity of WL rotation.

In further embodiments, a surface imperfection imprinted during course of manufacturing of a WL, or a blemish, originating from wear during use (see features 1130 and 1135 in FIG. 11) can be used to monitor angular motion of a WL. A useful surface blemish/imperfection can be identified using a computer vision algorithm such as digital image correlation and tracking (DIC), and/or artificial intelligence techniques (see, for example, "Digital Image Correlation and Tracking" retrieved from https://en.wikipedia.org/wiki/Digital_image_correlation_and_tracking on Mar. 23, 2020 and references 1-11 therein; Low-contrast surface inspection of mura defects in liquid crystal displays using optical flow-based motion analysis, by Du-Ming Tsai et al. in Vol. 22, No. 4, Machine Vision and Applications, July 2011; Jong-Seung Park, Seung-Ho Lee, "Automatic Mura Detection for Display Film Using Mark Filtering in Wavelet Transformation", IEICE Transactions on Information and Systems, Vol. E98-D, No. 3, pp. 737-740, March 2015; Machine Vision-Based Concrete Surface Quality Assessment. Journal of Construction Engineering and Management, by Zhu, Z. and Brilakis, I. 136(2), 210-218, 2010; all of which are hereby incorporated by reference in their entirety).

Absent a conspicuous intrinsic position marking (e.g local texture features, local structural features, local areas having alpha numeric characters, and others) on the WLC, a high contrast trackable feature can be added to a visible upper surface of the WL. For example, a distinguishable trackable feature can be applied to the surface of the WLC with a bonding agent, and/or ink or paint marking(s) such as a line, geometric shape, or pattern and/or a suitable colorful tracking feature to facilitate algorithmic feature recognition. In an embodiment, commonly available black electrical tape can also be used as a position marking. FIG. 11 shows a WL with a piece of black tape added 1140 to provide a position marking for monitoring the WLC rotation. In view of the instant disclosure, it will be apparent to those having ordinary skill in the art that a conspicuous scratch on the surface of the capstan, a manufacturer's stamping, or similar can be used a marking for the computer vision algorithm to track the motion of the WL. A digital camera can be disposed in a position providing a full view of the marked uppermost surface of a capstan (e.g. generally above a vertical capstan and laterally with respect to a horizontal WLC).

Figure 12A:
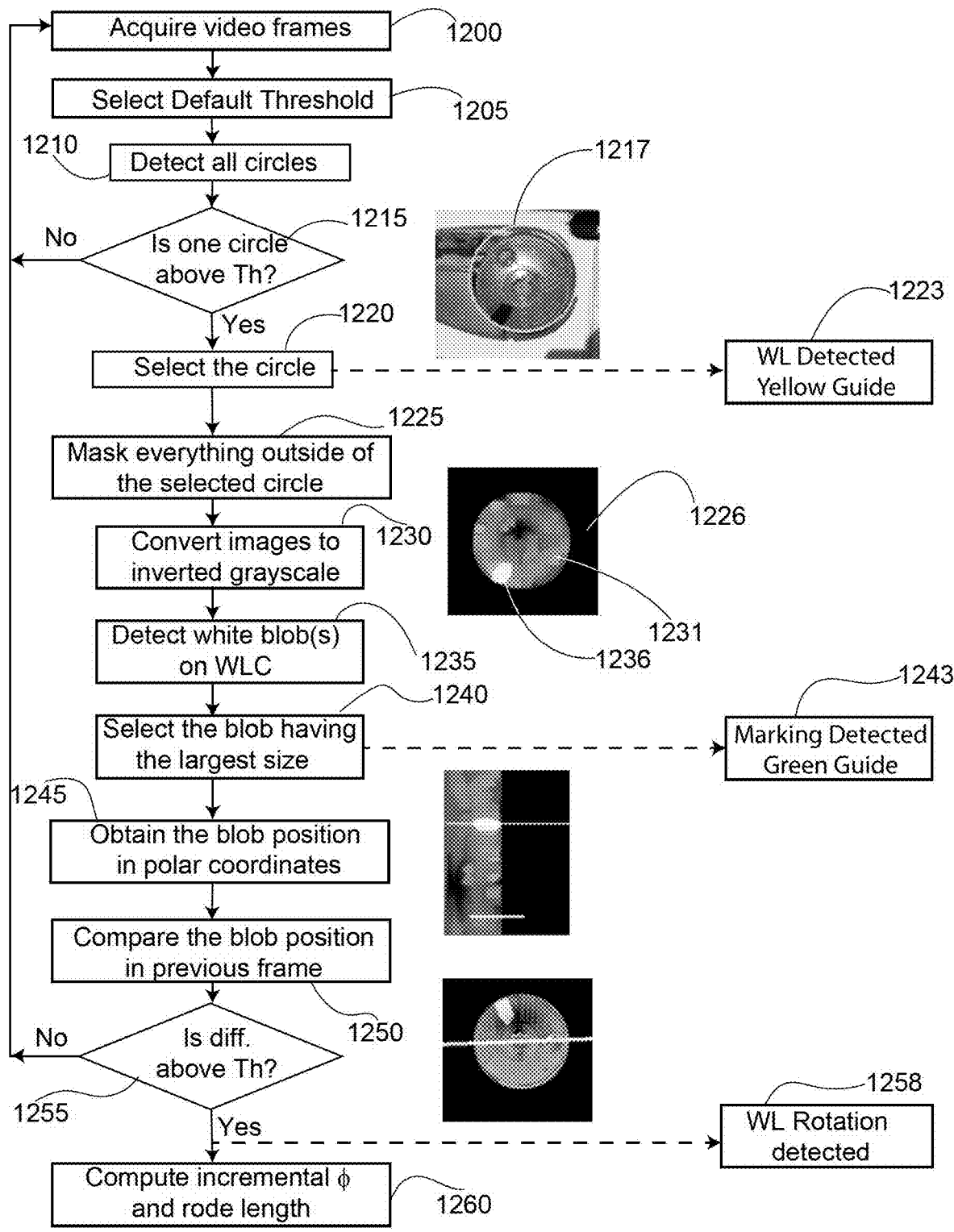
FIG. 12A shows simplified steps for measuring a rotation of a WL with a marking using a computer vision video frame analysis.

FIG. 12A shows a simplified flow chart of a method for measuring an incremental WL rotation angle and rode length in real time. The method includes capturing video frames of a distinguishable marking on a rotating WLC, detecting the marking on the moving WLC using Computer Vision algorithms, and tracking frame to frame movement of the marking to determine the amount and/or rate of the WL angular rotation and a length of rode corresponding to the rotation angle. The method can measure both instant and cumulative amounts of rotation and/or released length of rode.

One aspect of this method includes finding a circular boundary defining the outermost edge of the WL in each video frame. In various embodiments, the circular boundary can be identified using a conventional computer algorithm for detecting a circular boundary in images. A guide circle, "WL Guide" 1217 in FIG. 12A, can be drawn on the display of a digital camera. By this way, a user can adjust the position and orientation of the camera to capture the image of the WL in similar size and extent to WL Guide 1217. At step 1200 in FIG. 12A, the camera begins to acquire video frames comprising the WLC with a distinguishable marking. At step 1205 detection threshold parameters are set to identify candidate WL circles. Initial threshold is predetermined based on size, contrast and/or others. In some embodiments, threshold can be adjusted using a heuristic based on history. At step 1210 the Hough Circle algorithm and/or similar circle detection algorithms can detect all circles in the frame (https://docs.opencv.org/master/da/d53/tutorial_py_houghcircles.html, https://livecodestream.dev/post/hough-transformation/, https://en.wikipedia.org/wiki/Circle_Hough_Transform, all retrieved on Mar. 28, 2021, all of which are hereby incorporated in their entirety). At step 1215, the algorithm looks for one circle that is exclusively above the detection threshold. At step 1220 the circle meeting the threshold criteria is selected as "WL circle". At step 1223 detection of the WL circle is notified to the user by displaying WL Guide in yellow. If the WL circle detection fails in the frame being analyzed, the algorithm acquires next video frame and the steps of the WL circle detection is repeated as described above.

Another aspect of the method includes detecting a distinguishable marking on a WLC and finding polar coordinates of the marking relative to the center of the WL. The marking on the WLC can be identified using various image analysis algorithms which will be known to those having ordinary skill in the art. In an embodiment, everything outside of the WL circle in the frame is removed at step 1125 and an image 1226 in FIG. 12A. At step 1230 the contents of the WL circle can be converted to inverted greyscale computationally (i.e. 1231 in FIG. 12A) using the Open Source Computer Vision library (https://opencv.org/) "Open CV" routines "erode, dilate and bitwise invert" transformation programs (https://docs.opencv.org/3.4/index.html), Step 1235 is performed by with computer code in using the routine, "findContour" that is operable to detect all contours (features or white blobs) such as 1236 within the WL circle image and can assign each blob a center and radius (https://docs.opencv.org/3.4/d3/dc0/group_imgproc_shape.html; https://docs.opencv.org/4.x/d9/d8b/tutorial_py_contours_hierarchy.html) (the library of computer code and associated documentation of Open CV as were retrieved from the worldwide web at https://opencv.org/and https://opencv.org/releases/ on Mar. 28, 2021, are hereby incorporated in their entirety). A blob refers a distinguishable feature and/marking with a flat plate of uniform mass. At step 1240, the algorithm detects and organizes all white blobs by size, and selects the largest blob (or marking). At step 1243 the detection of the marking on the WLC is notified to the user by displaying the WL guide in a distinguishing color.

Further aspects of the method include detecting the rotation of WL using the marking on the WLC and computing the incremental WL rotation angle, $\Delta\varnothing_{INCR}$, and rode length released by the WL rotation, $\Delta X_{INCR}$. At step 1245 the polar coordinates of the blob in the frame are obtained and saved in memory of the local device and/or uploaded to a server. At step 1250 an angular coordinate of the blob ($\varnothing$) in an instant frame j ($\varnothing_j$) is compared to its value in the previous frame i ($\varnothing_i$). If the difference ($\Delta\varnothing_{ij}=\varnothing_j-\varnothing_i$) exceeds a predetermined threshold (Th) at step 1255, the detection of WL rotation is notified to the user by displaying "WL Rotation Detected" at step 1258. An incremental WL rotation angle $\Delta\varnothing_{INCR}$ and incremental rode length $\Delta X_{INCR}$ are computed at step 1260.

Figure 12B:
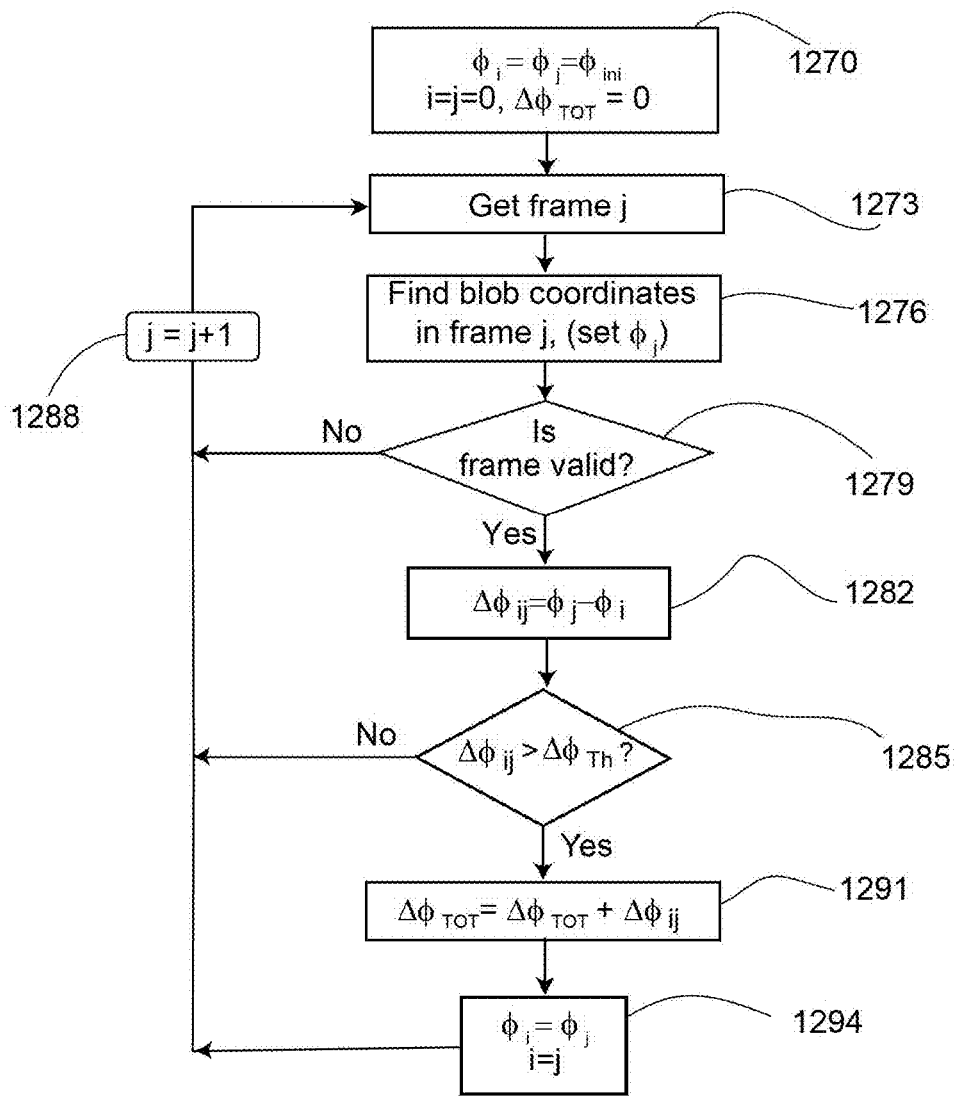
FIG. 12B shows a simplified flowchart for computing the angle of a WL rotation.

FIG. 12B is a simplified flowchart showing computation of an incremental and total WL rotation angle ($\Delta\varnothing_{INCR}$ and $\Delta\varnothing_{TOT}$) from WL video frames acquired. The initial blob coordinates ($\varnothing_i$ and $\varnothing_j$) are determined before the beginning of the routine. At step 1270 index i and j, and $\Delta\varnothing_{TOT}$ are initialized at step 1270. The algorithm gets frame j at step 1273 and detects the blob coordinates at step 1276. If the frame is invalid, j is incremented by one at step 1288 and subsequent frame is acquired. If the frame is valid at step 1279, the change in WL rotation angle between frame j and frame i ($\Delta\varnothing_{ij}$) is calculated at step 1282. If $\Delta\varnothing_{ij}$ does not exceed a predetermined threshold value ($\Delta\varnothing_{Th}$) at step 1285, j is incremented by one at step 1288 and next frame is obtained for analysis. If $\Delta\varnothing_{ij}$ is greater than the threshold value at step 1285, the total WL rotation angle, $\Delta\varnothing_{TOT}$, is calculated by adding the previous value of $\Delta\varnothing_{TOT}$ to $\Delta\varnothing_{ij}$ at step 1291. The index j, $\varnothing_j$ are set as i and $\varnothing_i$ respectively at step 1294. The index j is incremented by one at step 1288 and analysis continues with subsequent frames recorded during an anchoring operation as described above.

In additional embodiments, features on the WLC and/or WL associated modules can be identified using standard CV color identification algorithms (Boosting Color Saliency in Image Feature Detection, J. van de Weijer, Th. Gevers, A. D. Bagdanov, IEEE Transactions on Pattern Analysis and Machine Intelligence, Jul. 30 2005, all of which are hereby incorporated in its entirety).

In further embodiments, optical encoder pattern markings are onto top and/or lateral facing surfaces of a capstan. The optical encoder pattern can be in a decal, made using a tape, painted, or otherwise applied to the capstan, or an optical encoder pattern can be on the surface or module mounted onto the capstan of the windlass.

Positions of an optical encoder pattern can be recorded in digital camera video frames and used to determine the direction, amount, and rate of the windlass rotation (embodiments of optical encoder patterns and techniques to determine a direction, amount, and rate of rotation using such patterns are disclosed in "Data Acquisition Techniques Using PC's", $2^{nd}$ ed., Academic Press 2002, pps. 21-22 and "Advanced Optical Incremental Sensors: Encoders and Interferometers, Ch. 9 in Smart Sensors and MEMS, S. Nihtianov and A. Luque eds., Woodhead Publishing, 2004, Sec. 2.9.4, pps. 249-267 and references therein, which are incorporated herein for all purposes). In some embodiments, an encoder pattern can be useful to sense an incremental change in the angular position of the windlass. In further embodiments, an encoder pattern is used to sense an absolute position of the windlass (e.g. these embodiments include an encoder pattern that does not require any WL motion (rotation) to sense an angular position of the windlass). Depending on the embodiment, digital camera video frames having images of the encoder position can provide incremental relative changes in the position of a windlass, and/or can be used to sense the absolute angular position of the windlass in each frame.

In various embodiments, the imaging data acquired during anchoring operations can vary depending on lighting conditions, the angle of view, and the settings of a digital camera. The data collected during various anchoring conditions and a library of a commercial WL images can be analyzed further using image processing techniques and statistical methodology to reduce variability and improve the accuracy and/or reliability of the measurements. Accuracy and reliability of various steps of the disclosed methods such as the detection of characteristic markings and/or trackable features on the WLC can be further improved by training and testing machine vision and/or artificial intelligence algorithms with these large datasets. A necessary and sufficient length of rode required for secure anchoring can be is estimated deterministically using computed incremental WL rotation angle and a calibration factor described above. By this way, both the accuracy and/or reliability of WL angular rotation measurements and the machine vision and/or artificial intelligence algorithms can be improved continuously.

Optical Flow Analysis

It has been discovered that a machine vision algorithm known as optical flow analysis can be used to determine the proportional calibration factor relating a length of rode chain released to the WL rotation angle. In various embodiments, a video of a rode chain that is released and/or gathered during an anchoring operation can be acquired using a digital camera. The video comprises sequential frames/images of the rode chain link movement. The optical flow analysis algorithm can be applied to sequential frames having images of the rode chain link movement to determine a velocity and amount of rode chain release.

In general, optical flow analysis algorithms can perform a frame by frame analysis of a video sequence comprising an object (or a set of objects) moving in a consistent direction of motion with respect to an observer (the field of view of an image sensor). The term optical "flow analysis" originated from its use to estimate a velocity of fluid flow in a channel. Various methods and algorithms operable to perform optical flow analysis are disclosed in prior art references (see for example "Optical Flow" retrieved from https://en.wikipedia.org/wiki/Optical_flow Mar. 24, 2020; Chapter 3 in Optics and Artificial Vision, R. Rafael G González-Acuña, Héctor A Chaparro-Romo and Israel Melendez-Montoya, IOP Publishing, 2021; and Optical Flow and Trajectory Estimation Methods, J. Gibson and O. Marques, Springer, 2016; and references therein, all of which are herein incorporated by reference in their entirety.

According to the present method, links in a rode chain being released or gathered to/from the edge of the boat, pass through the field of view of a digital camera. Instructions operable to perform an optical flow analysis algorithm with a computer are used to detect and analyze frame by frame changes of contrast arising from areas of the chain in the digital images. As chain links move through the digital camera field of view, each frame is analyzed in relation to previously recorded frame(s) to detect the number of chain links passing through the field of view. Furthermore, based on changes in a gradient of serial images during the course of motion, both the direction and variations in "flow" can be found. By this method, a length of chain release is measured as the WL rotates through a determined angle.

There are embodiments where sufficiently accurate values of the velocity and cumulative amount of rode chain release can be obtained from an optical flow analysis. In these embodiments it is unnecessary to measure the WL rotation. In some of these embodiments WL rotation is not measured. In further embodiments measurement of WL rotation can be user selectable in a user interface (UI).

Chain length measurements obtained using optical flow analysis can require calibration, depending on the embodiment. Variability in the angle and distance of the camera with respect to the chain link emerging from the WL gypsy can introduce errors. Corrections for such variability can be made by adjusting the optical flow measurements of chain release based on a direct measurement such as a physical measurement of a length of chain released and/or chain link dimensions, that can be performed during measuring process. Alternatively, characteristic chain link and/or chain length data retrieved from a manufacturer's data base can be useful to make such corrections. It will be further understood that the reliability and accuracy of measuring chain length using optical flow analysis can be further improved by comparing the acquired data and results to physical measurement values of parameters for a specific chain obtained from a database and/or through onsite human interaction (e.g. direct measurement using a reference scale and/or other measuring device).

Fixed Position Camera Module Detecting WL and Rode Chain Motion

In some embodiments a crewmember can hold a camera in an elevated position selected to provide an unobstructed view of the top of a WL that is used to release and/or gather chain during an anchoring operation. In alternative embodiments, a camera can be held in an elevated position above the WL using a support module that can be attached to the deck or alternative part of the boat. A support module can provide improved stability and can be used to maintain the camera in a predetermined position relative to WL and/or the boat.

Figure 13A:
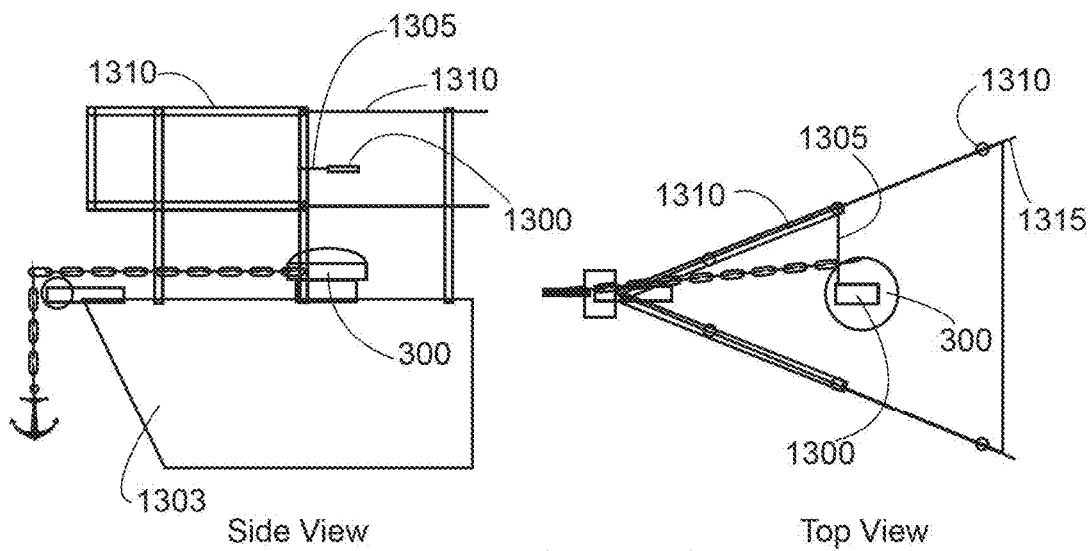
FIG. 13A shows a simplified diagram of a frame operable to maintain a camera device in a preferred position relative to a WL.

Maintaining a camera in a steady position manually by a crew member during the course of an anchoring operation can be challenging. Some examples of these challenges can include significant motion at the bow of a boat to due to wind and waves, distractions of the crew member recording the WL rotation by various reasons, and/or the movement of other multiple crew members near or around the area where the recording takes places. In a preferred embodiment, a digital camera 1300 is attached to a framework which is near the WL 300 at the bow of a boat 1303 to capture the full view of a WLC during anchoring shown in FIG. 13A. The camera 1300 can be mounted on a conventional "selfie stick" 1305 and/or other commercially available cell phone or camera mounting hardware such as an iPad/iPhone holder, a conventional tripod ball head mount, a webcam stand mount, and/or others. The framework includes a number of stanchions 1310, a number of metal lifeline cables 1315, a selfie stick 1305 or a single pole camera tripod having a module to a fix a camera securely. The stanchions 1310 are standard features of boats consisting of vertical chrome poles permanently mounted at evenly spaced intervals along the sides (port and starboard) of a boat and extended around its front (bow) and rear (stern). The metal cable 1315 is suspended between stanchions for the purpose of providing a "fence" to keep objects and crew members on the boat. A selfie stick 1305 or single pole camera tripod can be clamped to a stanchion nearest the WL 300. The selfie stick 1305 or the pole extends a distance from the stanchion to the WL. A module which affixes a camera device such as a smartphone and others can be mounted at the end of the pole. In an alternative embodiment, a camera tripod or camera mount with one or more suction cups can be used to affix the camera to a suitable position on a boat to acquire the full view video images of a WL.

In other embodiments, the camera can be mounted on a motorized pan tilt tripod mount, a motorized 3-axis gimbal stabilizer, a motorized telescope tracker, and/or a motorized stage or other support that can be moved to a selected position in a plane (x-y motion) or in spaced (x-y-z motion). Variously, depending on the embodiment, motors can configure the position of a camera. For example, motors such as stepping motors, analog servo motors and/or others can be used to movably tilt the camera to a selectable angle, and/or can translate the camera to a position operable to record a suitable view of the top surface of a WL. A camera angle and/or position can be effectuated using an electrical control module such as a joystick-style control module configured to allow an operator to adjust a camera mounting platform that is operable to provide rotation on two perpendicular axes, and/or translation in two or three perpendicular directions. The rotation can be limited or can be full 360-degree around one or both axes. The human interface for the control can be electromechanical comprising electrical switches, potentiometers, encoding disks, and/or joysticks, or equivalents. Alternatively, some or all portions of the human control interface can be effectuated using computer instructions that interact with an operator through input/output devices such as a touchscreen display, a mouse, buttons, and the like.

In various embodiments, the angle and/or position of the camera can be selected and/or maintained using a control loop. There are also embodiments where an angle and/or position of the camera is automatically effectuated programmatically based on computer vision with little or no human interaction. There are also embodiments where human interaction is provided to a computerized system to determine a "hybrid" positioning of the camera. The angle and positioning of the camera are maintained by a control loop in a number of embodiments.

In various embodiments, a smartphone device or a dedicated camera is used as a video frame capture device depending on the convenience of a crew member. The crew member installs a software application operable to perform various functions described in FIG. 12A and FIG. 12B to a smartphone and/or mobile computing device. The application captures the frames, performs the frame by frame analysis using available CV libraries, computes incremental WL rotation angle $\Delta\varnothing_{INCR}$, incremental rode released $\Delta X_{INCR}$, total rotation angle $\Delta\varnothing_{TOT}$, total rode length $\Delta X_{TOT}$, and displays them to the users. In some embodiments, a dedicated camera device with a wireless networking capability can be used to capture frames. The frames can be transmitted to other computing devices over a network where CV algorithms can be run to compute incremental WL rotation angle $\Delta\varnothing_{INCR}$, incremental rode released $\Delta X_{INCR}$, total rotation angle $\Delta\varnothing_{TOT}$, total rode length $\Delta X_{TOT}$ and further parameters.

Figure 13B:
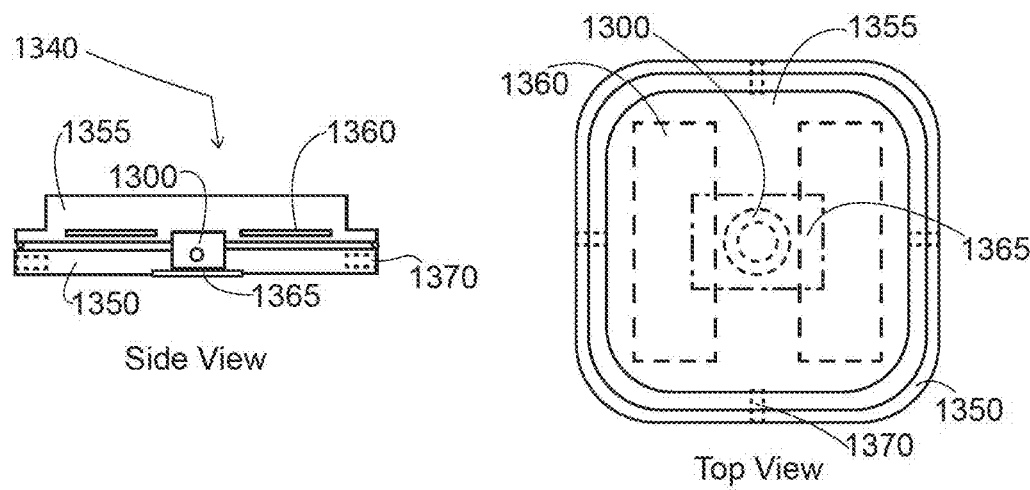
FIG. 13B is a simplified diagram of an embodiment of a camera module for capturing video images of a WL.

An example of such a dedicated camera module 1340 is illustrated in FIG. 13B. The module 1340 includes a digital camera 1300 mounted to a glass plate 1365 which is tightly sealed on an opening (or window) of a supportive baseplate 1550. The lens assembly of the camera 1300 is oriented toward the glass plate 1365. Camera 1300 is attached to PCBs 1360 mounted on the baseplate 1350 as shown in FIG. 13B. To keep electronic components of the module dry, the module is enclosed with a removable cover 1355 sealed to the baseplate 1350. All support electronics including microphone, amplifier, audio-video encoding, microprocessor, memory, wireless communications, battery, battery support, GNSS electronics, and others can be attached to PCBs 1360. Threaded holes 1370 on the edge of the baseplate 1350 can be designed to conform to the standard ¼" 20 threads per inch and/or various other standards used for tripods, "selfie sticks" and other camera mounting devices. Conspicuous coloration of the cover 1355 and air cavity in the seal can help personnel find the module easily if it falls in the water.

Rotation Sensing Windlass Modules
Construction

In alternative embodiments, a module for sensing windlass rotation can be mounted on the WL. As was disclosed above, the angle (Ø) of WL rotation and/or angular velocity of the WL can be multiplied by a calibration factor to find a length of anchor rode release, and/or a rate of anchor rode release.

Nearly all small craft windlasses have a standard winch handle socket 315 located at the center of the capstans to allow a WL motor clutch to be disengaged, as shown in FIG. 14A and FIG. 14C. It was discovered that the nearly universal presence of this standard socket is useful to attach a WL module (WLM) in a fixed position on the WL of any boat having this standard socket. In conventional conforming WL designs, the winch handle socket 315 profile is an 8-pointed star 1420 of standard dimensions. The cross section 1420 (8-pointed star) is generated by the union of two identical concentric squares 1424, 1426 having 17.4625 cm sides 1428, one turned 45° with respect to the other around the common center point, such as shown in FIG. 14A FIG. 14C shows an embodiment of a keyshaft 1405 attached to a baseplate 1403 of a WLM 1400. The keyshaft 1405 shown in FIG. 13C can be inserted into the winch handle socket 315 to hold the module 1400 in a fixed position on the capstan 310 of WL 300. In a preferred embodiment, the keyshaft 1405 has general profile of the 8-pointed star winch handle socket 1420 described above (see FIGS. 14A and 14C). However, the dimensions of the keyshaft 1405 cross section in preferred embodiments are uniformly reduced slightly from the nominal standard dimensions of the winch handle socket to allow sufficient clearance to accommodate machine tolerance, thermal expansion, particulate contamination, and lubrication. In some embodiments the dimensions of the keyshaft can be approximately 99.5% of the WL socket cross sectional dimensions. In further embodiments, a keyshaft cross section dimensions can be approximately 97% to 99.75% of the standard WL socket cross section, although a slightly greater factor may be operable, depending on the embodiment.

In alternate embodiments, the cross section of a keyshaft 1405 has at least three vertex extremities that can lock the keyshaft into a fixed position in a winch handle socket. For example, a keyshaft cross section can have 2 pairs of opposing vertices 1429 operable to lock the keyshaft into a fixed position within the winch handle socket, such as the square cross section 1434 or the pointed cross 1435 shown in FIG. 14C. Another embodiment of a keyshaft 1437 has three vertex extremities comprising two opposing vertices that similarly are collectively operable to lock the keyshaft in a fixed position within the 8-pointed star winch handle socket. The dimensions of various embodiments are uniformly reduced slightly in the same proportions as for the 8-pointed keyshaft disclosed above. In various embodiments, a keyshaft can be locked into a winch handle socket using a mechanism selected from among prior art mechanisms useful to lock a detachable winch handle into a winch handle socket (see for example, mechanisms disclosed in U.S. Pat. Nos. 6491285B1, 7114705B2, Australian Appl. No. Au 2012100754A4, European Pat. No. EP2305431B1, U.S. Pat. No. 4,883,255).

In various embodiments, a WLM can be removed from the winch handle socket on the WL and stored in a protected area when it is not in use. The WLM can installed on the WL before the start of an anchoring operation for use during the operation, and can remain attached to the WL until the operation is completed.

Markings and Patterns

Figure 15A:
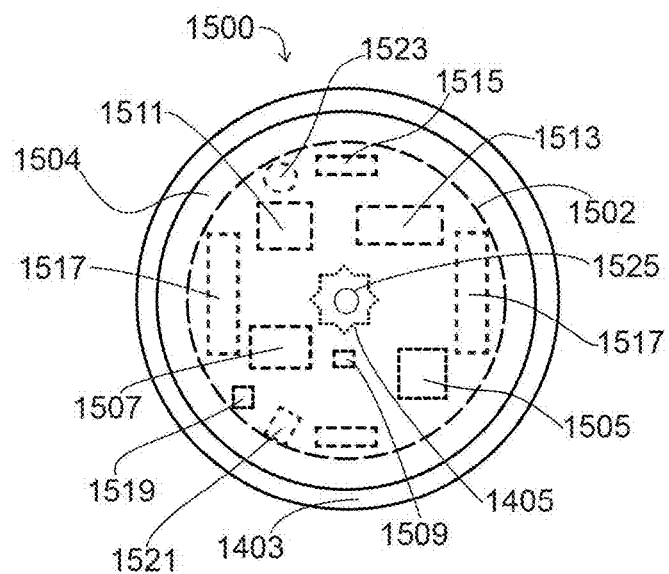
FIG. 15A is a simplified view of a WLM including one or more MEMS sensors and all support electronics to determine an angular rotation of a WL.
Figure 16:
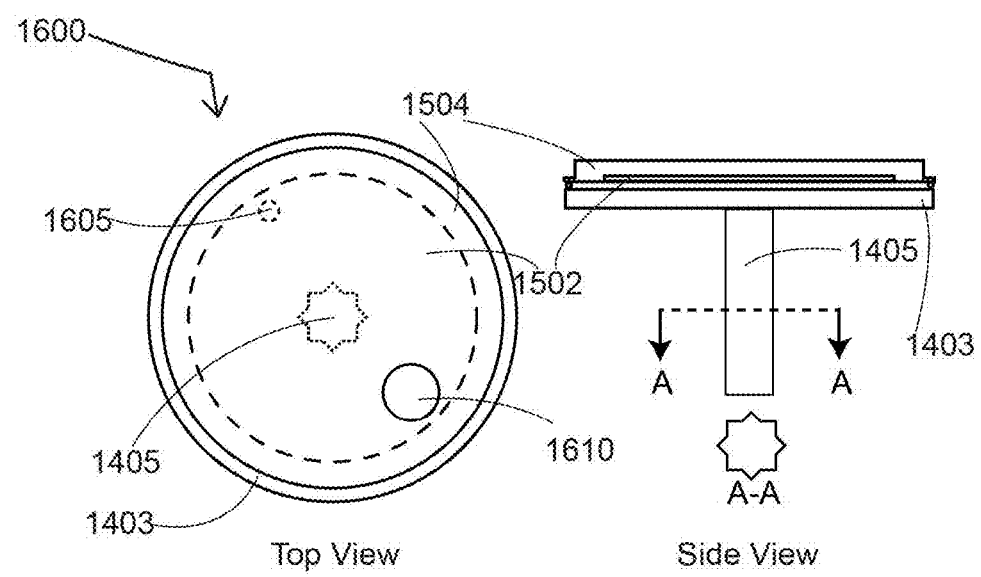
FIG. 16 shows a simplified embodiment of a WLM having an emitter in the module to send a signal to a receiver at a fixed position of the boat surrounding the WL to determine rotation of a WL.

A visible surface of the WLM can include specialized conspicuous markings configured to optimize their detection and/or tracking in digital camera images, and/or to allow use of simplified or improved computer vision algorithms for determining the WL rotation angle and/or rate of WL rotation. For example, the WLM 1400 shown in FIG. 14C can include a passive marking in the form of a high contrast circular shape 1610 (FIG. 16) affixed to the surface of the cover 1504 (FIG. 15A and FIG. 16). A circular marking can be easily detected using a simplified computer vision blob recognition algorithm. In further embodiments, a visible top and/or side surface of a WLM can include a high contrast topological pattern, and/or an optical encoder pattern. An optical encoder pattern can be useful to sense an incremental change in the angular position of a WL, and/or an absolute angular position, as disclosed above.

A WLM 1400 such as shown schematically in FIG. 15A and FIG. 16 can have a cover 1504 to protect components of the module from environmental factors such as sunlight and sea water. The cover can be removable. The cover can include window areas consisting of materials that are relatively transparent to electromagnetic communication signals used for bluetooth, wifi, GPS, cellular radio and the like, and to light of various wavelengths. In some embodiments the entire cover can be transparent. In some alternative embodiments, a WLM can be attached to a WLC by an adhesive method such as attaching the WLM to the WLC using a tape or glue, and/or mechanical attachment means such as screws through the WLM into threaded holes in the WLC.

As was disclosed above, a WLM can have include a marking or pattern useful for sensing an angular velocity and/or position based on frame by frame camera monitoring (i.e. video frames).

WLM Instrumentation

A WLM can comprise electronic and/or electromechanical motion sensing instrumentation (WMSI) operable to sense WL motion. The WMSI can include a gyroscope, an accelerometer, a strain gage; a magnetometer, a processor and memory, a power source, a wireless network interface device (wireless NIC). including micro-electromechanical systems (MEMS), a microprocessor, a wireless network interface (wireless NIC), and instructions and/data operable for the instrumentation components to provide sensing/or detection of the angular position, angular velocity, and/or angular acceleration of the WL. WMSI can have various active and/or passive electronic devices and/or electromechanical devices useful to cooperatively determine an angular position and/or rotation of the WL. A wireless NIC can be operable to send and/or receive data via WiFi, Bluetooth, Zigbee, and/or others. WMSI can comprise a microphone, a sound emitter (such as a buzzer, a piezoelectric transducer, a loudspeaker, and others), a directional electromagnetic radiation receiver (detector) (e.g. a light detector such as a camera, a photodiode or photoresistive circuit element), a source of electromagnetic waves (such as a light emitter such as a photodiode, a laser, a radio transmitter), and means to collect, direct, and/or select electromagnetic waves (such as a reflector, a director, a lens, a filter and others). A WLM 1400 can also include a power source such as a battery, a supercapacitor, a photovoltaic cell, a power distribution system, and/or a wireless inductive and/or capacitively coupled charging circuit. The WLM can also have a connector operable for connecting the WLSI to external power for the purpose of charging the battery in some embodiments. Various embodiments include an inertial measurement unit (IMU) operable to sense WL rotation. WMSI and auxiliary components can be based on MEMS, discrete component technology, conventional integrated circuits, and/or combinations thereof.

Disclosed WLSI can detect WL rotation or position based using force or inertial sensors. In some embodiments WLSI include an ambient magnetic field sensor (magnetometers) operable to sense a direction of the earth's magnetic field.

Other WLSI can detect WL rotation or position based on sensing a source of sound or electromagnetic radiation. The source of sound or electromagnetic radiation can be mounted on the WLM, or it can be supported at a fixed position in the environment of the boat surrounding the windlass having an unobstructed view of the WLM (e.g. in line-of-sight), depending on the embodiment. The sound or electromagnetic radiation can be received using a directional receiver/detector on the WLM or a directional receiver/detector that is supported at a fixed position in the environment of the boat surrounding the windlass such that the fixed position has an unobstructed view of the WLM (e.g. line-of-sight).

For example, the source can be a light emitting diode (LED), laser, or ultrasonic sound emitter on the WLM, and the receiver can be a camera, photodetector, or microphone fastened to a surrounding structure on the boat (in line of sight of the WL). In another WLSI, a camera, photodetector, or microphone is on the WLM, and the LED, laser, or ultrasonic sound emitter is fastened to a surrounding structure on the boat in line of sight of the WL.

Yet another example has both the emitter and receiver on the WLM—the emitter can be a laser diode emanating a characteristically pulsed laser beam radially from the WLM to surrounding structures during WL rotation. Reflected laser pulses can be received by a photodetector on the WL. Since the pulse transit time delay depends on the distance to the reflecting structure element, it will be characteristic of the structure element and the angular position of the WL when the pulse was emitted. In view of this example, one of ordinary skill in art will appreciate that conversely, a laser and/or photodetector can be mounted on a surrounding structure such that a pulse emanating from the laser is reflected from a characteristic target element (e.g. such as small mirror or other characteristic feature at a certain coordinate on the WL).

It can be understood as well that including a providing a plurality of suitable emitters, receivers and/or characteristic reflectors on the WLM and/or on surrounding structures can improve angular resolution and/or sensing of the WL rotation.

As the WL rotates, the motion sensing WLM can determine an amount, a direction, and a velocity of an angular rotation of the WL. In some embodiments, the module has a processor and memory that are used to perform calculations based on data acquired by the module. Depending on the embodiment, any or all of the above mentioned direction, angular velocity, and/or direction of rotation can be obtained from sensors in the module, or by performing computations using the sensor information from the sensors. For example, in some embodiments, a WLM has accelerometers that can sense acceleration in three independent directions, and a magnetometer operable to sense a relative direction and magnitude of the Earth's magnetic field. The WLM can have a processor and memory comprising data and instructions operable to determine values of angular velocity, angular position, angular acceleration and other parameters characteristic of windlass rotation based on information from a sensor.

In some embodiments, the amount of windlass rotation can be determined using sensed real time values of vector acceleration or the relative direction of the Earth magnetic field, or based on a combination of the real time acceleration and magnetic field information used cooperatively. In further embodiments, a WLM can have an inertial navigation unit (INU) that comprises a processor, magnetometer, MEMS based gyroscope, and e-compass that can output relatively high resolution, error-corrected values of real time acceleration, position, magnetic field, and various other parameters from which the angular position, angular velocity, and angular acceleration of the windlass are easily determined with a microprocessor. In these cases, the amount of windlass rotation during a selective time interval and other parameters can be computed by a processor on the WLM, or can alternatively be computed with application software in a remote device on a common network. In the embodiments, information from the sensors and/or the real time windlass parameters computed on the WLM, can be transmitted to the remote computing device using a wireless network communication layer. In some embodiments, at least a portion of data transmission to/from the WLM can be secure (encrypted). A software application in the remote computing device can determine and/or display the angular rotation of the WL and the cumulative length of rode traveled through the gypsy based using information transmitted from the WLM. The remote computing device can be a cellular smartphone having a processor, memory media, display, digital camera, human input device, speaker, and application programs operable to perform the various operations and provide a human interface for user interaction.

In an embodiment, FIG. 15A illustrates a simplified diagram of a motion sensing WLM 1500 mounted on a PCB 1502 to determine rate and amount of angular rotation of a WL. The WLM 1500 have a 3D MEMS sensor 1505 which can be a single 3D MEMS sensor or a sensor fusion product having multiple 3D MEMS sensors depending on the embodiment. The module 1500 also include support electronics such as a microcontroller 1507 and a clock circuit 1509 to control the collection, storage, processing of the sensor data in the WLM, a dynamic memory unit 1511 to store the collected data locally, an integrated circuit 1513 and antenna 1515 to support for wireless network transmission using WiFi 801.11 and Bluetooth 5.0) from the MEMS sensor to a computing device, two lithium ion batteries 1517 to provide power for the circuit system, a power regulator 1519, an external connector 1521 such as a mini USB to charge the WLM 1500, an LED 1523 to show on/off state of the WL module, a push button switch 1525 to turn on and off the WLM.

FIG. 15A also shows a keyshaft 1405 extending downward from supporting baseplate 1403 of WLM 1500. Some embodiments have alternative supporting means such as described with respect to FIG. 14A-C above. A cover 1504 such as described above can enclose the WLM 1500.

Figure 15B:
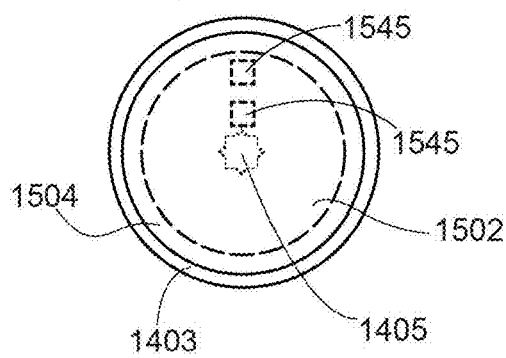
FIG. 15B is a simplified view of a WLM including two 3-axial MEMS accelerometers configured to sense an angular rotation of a WL.

A 3D accelerometer is a sensor that measures changes in velocity along three axes in a cartesian coordinate space. A single 3D accelerometer cannot reliably measure WL rotation angle, however two 3D accelerometers located at different positions relative to the WL center can be used to measure WL rotation. FIG. 15B is a simplified diagram of a WLM 1540 having two MEMS accelerometers 1545 mounted on a PCB 1502 having all support electronics described above. The accelerometers can be at different radial coordinates measured from the axis of WL rotation. The WLM 1540 can have a keyshaft 1405 extending downward from a supporting baseplate 1403 and a cover 1504 enclosing the WLM 1540 as described with respect to FIG. 14A-C and FIG. 15A. Tangential acceleration can be used to compute incremental changes in WL rotation angle, $\Delta \varnothing_{INCR}$.

Rotational motion using an accelerometer can be determined as described in U.S. Pat. No. 8,352,210 (Mark J. Kranz, 2013, Multiple accelerometer apparatus for counting rotations of an object, and method of use, U.S. Pat. No. 8,352,210, filed Jul. 23, 2010 and issued Jan. 8, 2013) and other studies (Placement of Accelerometers for High Sensing Resolution in Micromanipulation, W. T. Latt, U-X. Tan, C. N. Riviere, and W. T. Ang, Sens Actuators A Phy, 2011; EcoIMU: A Dual Triaxial-Accelerometer Inertial Measurement Unit for Wearable Applications, Yi-Lung Tsai, Ting-Ting Tu, Hyeoungho Bae, Pai H. Chou, 2010, International Conference on Body Sensor Networks, which are hereby incorporated by reference in their entirety).

In some embodiments, accelerometers 1545 can be mounted on a circular PCB 1502 at different radial distances from the center of the WL rotation. The "yaw" rotation around an axis perpendicular to a plane of the WL rotation, can be derived from the measured accelerations and the difference between the radial distances (difference in radial coordinates between the accelerometers) as described in the publication "Using Two Tri-Axis Accelerometers for Rotational Measurements" Application Note AN 019, Kionix, Inc. July 2015 (retrieved from https:// d10bqar0tuhard.cloudfront.net/en/document/AN019-Using-Two-Tri-Axis-Accelerometers-for-Rotational-Measurements.pdf on Mar. 1, 2021). The radial components of accelerations $a_1$, $a_2$ of the accelerometers at distinct radial positions $r_1$, $r_2$, from the center of the rotating WL are given by:

$$a_{r1}=\omega^2 r_1 \text{ and } a_{r2}=\omega^2 r_2 \qquad \text{EQ. 5}$$

where $\omega$ is the angular velocity of the WL. The angular velocity of the WL, $\omega$, can be obtained from these respective radial accelerations and the difference between radial distances:

$$|\omega|=\sqrt{(|a_{r1}-a_{r2}|)}/\sqrt{D_r} \qquad \text{EQ. 6}$$

where $D_r$ is absolute value of the difference in radial distance $|r1-r2|$ between the accelerometers. Those having ordinary skill in the art will recognize that $D_r$ can be measured and/or refined by a standard calibration procedure. The accelerometers have an angular component of acceleration (acceleration in the circumferential direction of the WL rotation) given by:

$$a_{\phi 1}=r_1 d\omega/dt \quad a_{\phi 2} r_2 = d\omega/dt \qquad \text{EQ. 7}$$

where $a_{\phi 2}$, $a_{\phi 1}$ are the tangential accelerations sensed by each of the respective accelerometers and the angular acceleration. The relationships in EQ. 6 only provide a magnitude of angular rotation. Additional information defining the sense (direction) of rotation is necessary to calculate the algebraic total length of rode release. The direction of rotation can be extracted from sensing the circumferential force which provides the tangential accelerations in shown in EQ. 7. The accelerations comprise the time dependent changes in angular velocity which collectively determine the direction of WL rotation at any given time.

EQ. 6 by itself can be useful to reject measurements that fall below a selected threshold value where there is a likelihood of excessive noise, insufficient accuracy or other sources of unreliability. Similarly, an exceptional aberration in angular acceleration (EQ. 7) can be useful to reject a short-lived fluctuation. In practice, an accurate total length of rode release can be calculated using EQs 6 and 7 to accumulate the algebraic total rotation of the WL over the time intervals between retained measurements (after discarding measurements that were rejected because of falling below a minimum angular velocity parameter, or other criteria.

Gyroscopes can be useful to measure motion such as rotation. Miniature MEMS gyroscopes are generally embedded in smartphones, smartwatches, and tablets. Recent advances in the MEMS technology can provide low drift, <0.2°/h, high thermal stability and high resolution. MEMS gyroscopes modules having specified limits of precision and drift are commercially available. Many of these WL modules have an embedded microcontroller operable to transmit and receive data using a standard bus communication protocol. For example, a number of MEMS gyroscope modules can send data over the Inter-Integrated Circuit (I²C) bus. MEMS accelerometers, magnetometers, and eCompasses also include an I²C bus or similar wireless communication protocol to transmit and receive data.

A so called 3D gyroscope can measure angular velocity around three axes relative to the force of gravity: X—"roll", Y—"pitch" and Z—"yaw". Changes in pitch or yaw, respectively, are transmitted over a wireless network and/or Bluetooth to other devices that compute incremental changes in WL rotation angle, $\Delta\emptyset_{INCR}$.

Figure 15C:
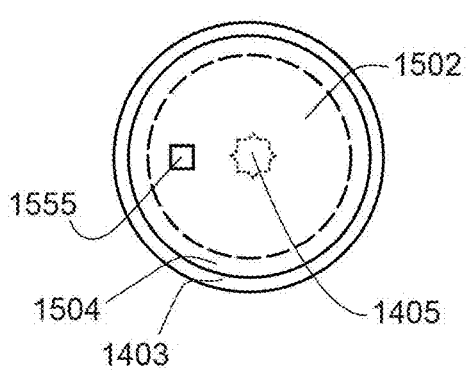
FIG. 15C is a simplified view of a WLM having one 3-axial MEMS gyroscope configured to sense an angular rotation of a WL.

In further embodiments, a multi-axis MEMS gyroscope can be used to measure "yaw" rotation around a z-axis to determine incremental WL rotation angle, $\Delta\emptyset_{INCR}$. FIG. 15C illustrates a simplified diagram of a WL module 1550 that integrates a 3D MEMS gyroscope to measure incremental WL rotation angle. The module 1550 in FIG. 15C shows the placement of a MEMS gyroscope 1555 on a PCB 1502 +having all electronic supports described with respect to FIG. 15A. The WLM 1550 can have a supporting baseplate 1403, a keyshaft 1405, and a cover 1504 as described with respect to FIG. 14A-C and FIG. 15A.

In some embodiments, a MEMS gyroscope module 1550 can be used to determine the WL rotational angle. The angular velocities in x, y and z-axis, $\omega_x$, $\omega_y$ and $\omega_z$ are acquired from WLM 1550 synchronously rotating with WL with a I2C bus communication protocol. The readings can be transmitted over a wireless network to a smart mobile computing device to determine if the angular velocity in z-axes exceeds a selected threshold value depending on the application. The WL rotation angles can be extracted from gyroscope signals using conventional methods detailed in the prior art (See for example, Wearable Sensors, Fundamentals, Implementation and Applications, Edward Sazonov and Michael R. Neuman, 2014, Elsevier Inc., Encyclopedia of Nanotechnology, Bharat Bhushan, 2016, Springer Science Business Media Dordrecht, 1427-1440, which are hereby incorporated by reference in their entirety).

In further embodiments, a MEMS 3D eCompass is used to measure the rate and angle of WL rotation. The MEMS 3D eCompass integrates both a 3-axis accelerometer and 3-axis magnetometer to sense rotation in a single module with a microcontroller. The magnetometer tracks the device orientation with respect to the Earth's magnetic field in 3 dimensions. The accelerometer and magnetometer data are used together to compute the incremental changes in WL rotation angle, $\Delta\emptyset_{INCR}$.

Figure 15D:
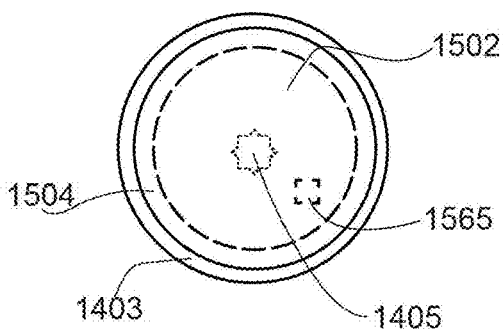
FIG. 15D is a simplified view of a WLM having one 3-axial eCompass configured to sense an angular rotation of a WL.

FIG. 15D illustrates a simplified view of a WLM having a 3D eCompass 1560 to sense the angular rotation of a WL. The WLM 1560 includes a MEMS eCompass 1565 mounted on a PCB 1502 having all electronic supports described with respect to FIG. 15A. The WLM 1560 can have a supporting baseplate 1403, a keyshaft 1405, and a cover 1504 as described with respect to FIG. 14A-C and FIG. 15A.

Similar to the WLM 1550, angular velocities in x, y and z-axis, $\omega_x$, $\omega_y$, and $\omega_z$ of a WL can be sensed by the WLM 1560 and transmitted over a wireless network by way of a smart device I²C bus communication protocol. If value of angular velocity exceeds a selected threshold, rotational data is normalized against calibrated WL magnetic profile data. The WL rotation angle can be extracted from eCompass data using conventional methods (Wearable Sensors, Fundamentals, Implementation and Applications, Edward Sazonov and Michael R. Neuman, 2014, Elsevier Inc., Encyclopedia of Nanotechnology, Bharat Bhushan, 2016, Springer Science Business Media Dordrecht, which are hereby incorporated by reference in their entirety).

Figure 15E:
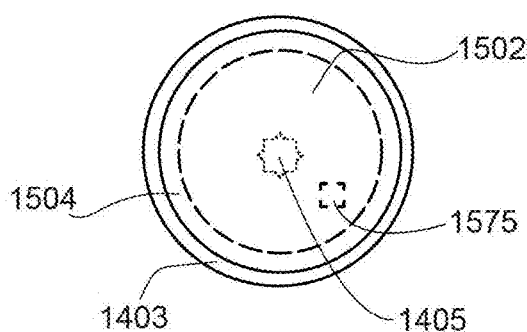
FIG. 15E is a simplified view of a WLM having an IMU module configured to sense an angular rotation of a WL.

In some embodiments, an inertial measurement unit (IMU) 1575 having a combination of 3D MEMS gyroscope, 3D MEMS accelerometer, and 3D MEMS magnetometer can be used to determine rate and angular rotation of a WL (FIG. 15E). The WLM 1570 includes a IMU 1575 mounted on a PCB 1502 having all electronic supports described with respect to FIG. 15A. A suitable UMI module with 6 axis or 9 axis MEMS sensors can be purchased from a MEMS manufacturer such as Advanced Navigation Inc., LeddarTech Inc., Analog Devices, TDK, VectorNav, and/or others. Principles of operation and use of IMU modules for detecting motion are described by N. Constant et al. (Ch. 13 in Wearable Sensors, Fundamentals, Implementation, and Applications, $2^{nd}$ ed., Academic Press, 2021), Y. Dong (Ch. 8 in MEMS for Automotive and Aerospace Applications, M. Kraft and N. M. White, eds., Woodhead Publishing, 2013) and N. Tlliakos (Ch. 10 in MEMS for Automotive and Aerospace Applications, M. Kraft and N. M. White, eds., Woodhead Publishing, 2013) and T. Tamura (Ch. 2.2 in Wearable Sensors, Fundamentals, Implementation, and Applications, $2^{nd}$ ed., Academic Press, 2021) and references therein, all of which are incorporated by reference in their entirety for all purposes. In some embodiments Kalman Filters (Kalman Filtering and Information Fusion, Hongbin Ma, Liping Yan, Yuanqing Xia, Mengyin Fu, 2020, Springer Science Press Beijing, which are hereby incorporated by reference in their entirety) can be used to improve the accuracy of measurements from multiple MEMS sensors.

The module 1570 can have a supporting baseplate 1403, a keyshaft 1405, and a cover 1504 as described with respect to FIG. 14A-C and FIG. 15A.

WL Modules Having an Emitter in the Module

There are some embodiments where directional signal receiver(s) ca be in the external environment and a source of signal emitter/transmitter is on the WLM to determine rotation of a WL. In such cases, two signal sources (emitter or transmitter) on the WLM are necessary to distinguish sense direction of WL rotation. Using a plurality of signal sources on the WLM improves resolution of an angular rotation significantly.

In some embodiments, a WLM can have luminous markings that can facilitate machine vision tracking, particularly when there is poor ambient lighting and when it is dark. Luminous markings can be fluorescent, e.g. they may absorb portions of ambient light, such as blue or ultraviolet light, and emit light in a different predetermined region of the spectrum to improve sensing. In further embodiments a marking can be a powered light emitting device such as a light emitting diode (LED).

FIG. 16 shows a simplified diagram of a WLM 1600 having active 1605 and passive 1610 markings. The LED 1605 and associated components can be on a printed circuit board 1504 (PCB) is mounted to a baseplate 1403 having a downward extending keyshaft 1405 as described above. The LED 1605 can be proximate to the outer edge of the WLM. The WLM can have a cover 1504. The passive marking 1610 can be affixed to the surface of the cover 1504 as shown.

In some embodiments, these methods can be used co-operatively to improve the reliability and accuracy of the measurements of WL rotation angles. For example, a MEMS accelerometer and a MEMS gyroscope can be integrated in a WL module to determine WL rotation angles. An integrated WL module can be particularly useful if angular velocity changes are small and associated with a drift during the course of a long measurement or if changes in linear acceleration along the y-axis of the accelerometer would offset the tangential velocity computed. In another embodiment, the WLM 1550 and the WLM 1600 can be combined as one module such that the WL rotation angle is measured using a gyroscope and/or an active marking such as an illuminated LED or a passive circular marking 1610 to ensure a reliable rode length measurement during an anchoring operation.

WL Modules Receiving a Signal from a Fixed Position Emitter

In some embodiments, a WLM can receive a signal from an emitter (transmitter) located at a fixed position in the environment of the boat surrounding the WL to determine rotation of a WL.

Figure 17:
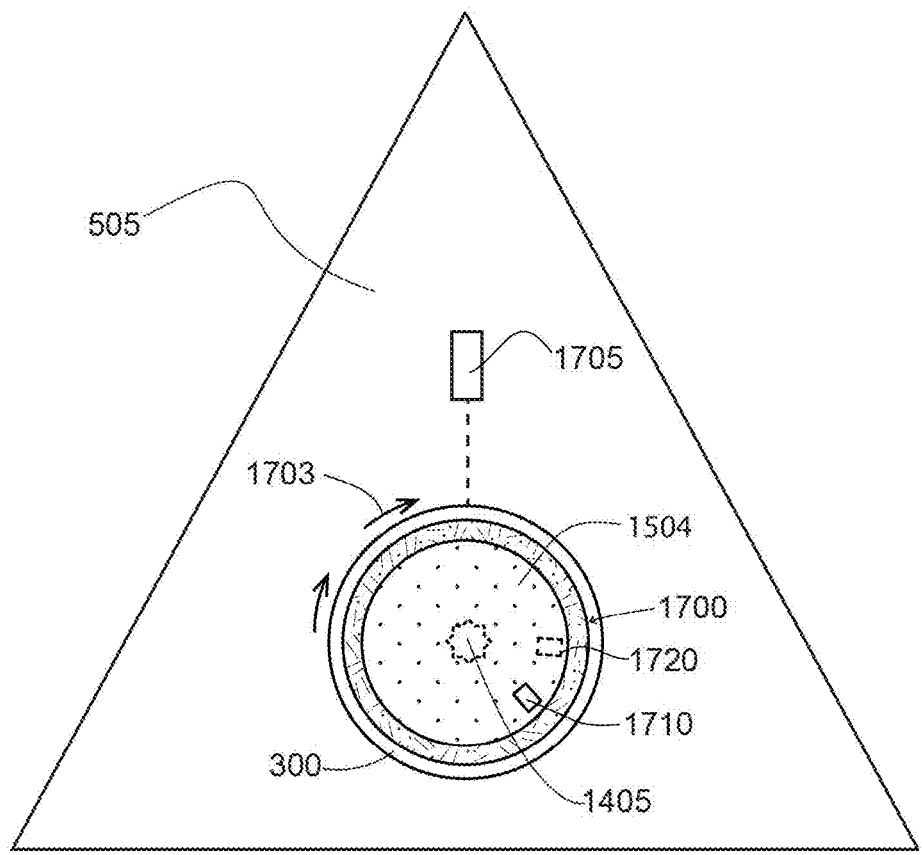
FIG. 17 shows an embodiment of WLM having one or more receivers in the module configured to receive from an emitter located at a boat near a WL.

FIG. 17 shows a simplified embodiment of a WLM 1700 having one or more directional receivers configured to detect a signal from an emitter located at a fixed deck position boat deck 505 in an unobstructed line of view of a WL 300. The exterior signal source can be either "natural" or synthetic. In some embodiments an emanating signal can be electromagnetic radiation such as light and magnetism or sound waves.

One configuration with respect to FIG. 17, has only a single directional receiver 1710 on the WLM that can detect a signal emanating from the external fixed position emitter 1705 when the receiver 1710 is in a 12 o'clock where it faces the emitter 1705. This configuration can resolve the rotation in 360° ($2\pi$ radian) increments provided where the WLM 1700 has means to resolve the sense of rotation (e.g. clockwise 1703 as shown, or counterclockwise), or the sense or rotation can be determined in another way (for example, from sensing radial and angular forces).

In further embodiments a WLM 1700 can have a plurality of directional receivers facing outward at additional angular positions on the outer edge of the WLM. A WLM having at least a first 1710 and second receiver 1720 in distinct angular positions can sense the direction of angular rotation using the order in which the signal from emitter 1705 is detected by the first 1710 and second receivers 1720. Furthermore, having a greater number of outward facing directional receivers in additional angular positions can increase the angular resolution of detecting rotation. For example, a WLM having four receivers at 90° increments around the WL can provide 90° resolution. It will be apparent that resolution can be improved by providing a relatively greater number of receivers. In some embodiments the periphery of circular WLM can have a circular array of receiver devices on a tape.

In a configuration having two directional receivers on the WLM depending on a single synthetic external transmitter signal source used to determine WL rotation, the sense of rotation cannot be determined if the two receivers are in mirror opposite positions with respect to the center of the windlass (e.g. 180° degrees apart). In general, at least two directional receivers must be situated less than 180° apart (or equivalently greater than) 180°) in order to detect the direction of rotation.

In further embodiments, a single directional receiver on WLM determine the amount and sense of rotation based using signals originating from a plurality of ambient locations, provided however at least two of the ambient locations are less than 180° degrees apart with respect to the center of the windlass.

The WLM 1700 includes all support electronic and electromechanical devices as disclosed above. The WML 1700 can be securely attached to a WL using a keyshaft 1405 as described with respect to FIG. 14A-C, and have a cover 1504 as disclosed with respect to FIG. 15A.

Figure 18:
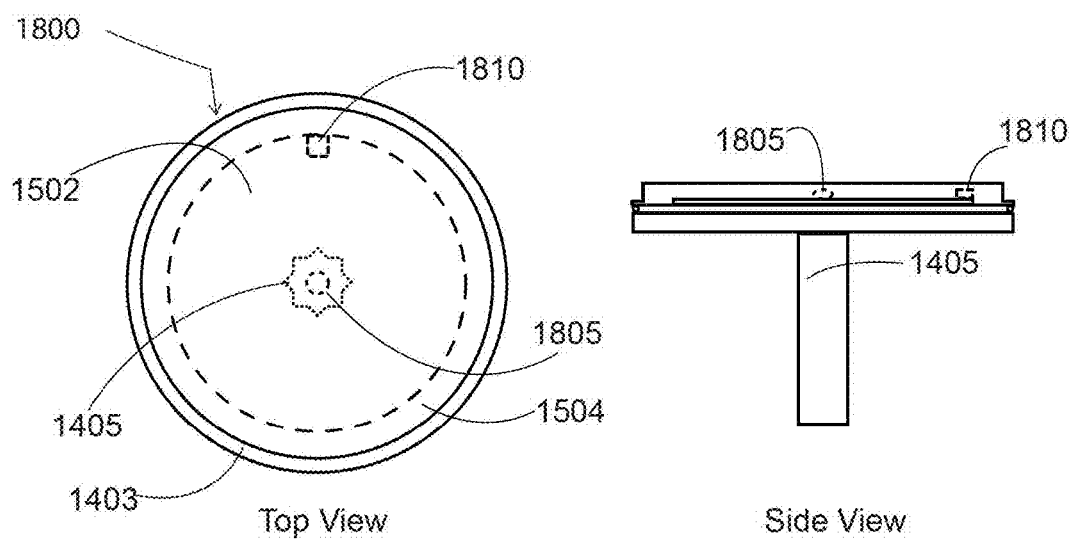
FIG. 18 shows top and side views of a WLM including omnidirectional and directional microphones.

A WL module having a plurality of microphones to sense sound in the vicinity of a WL can be used to detect a WL rotation angle. FIG. 18 shows a simplified diagram of a WLM 1800 using directional and omnidirectional sound sensing to detect motion of a rotating WL. A directional microphone 1810 having relatively higher sensitivity to sound coming in from directions facing the microphone can be mounted at or proximate to the periphery of the WL to selectively detect sound arriving from a radial direction. A omnidirectional microphone 1805 can be mounted at or near the center of the WL. In the embodiment shown in FIG. 16, microphones are on a PCB 1502 that can be attached to a windlass. The microphone frequency response can have a range of approximately 8 Hz to 20 kHz, although other ranges are operable, depending on the embodiment. The PCB can be mounted on a circular baseplate 1403 and can include all necessary circuitry, supporting components, and a power source. A keyshaft 1405 such as described with respect to FIG. 14C can extend downward from the baseplate 1403 to securely attach to the WL in a fixed position. There can be a cover 1504 as described above to protect the module from bright sunlight and sea water.

Figure 19:
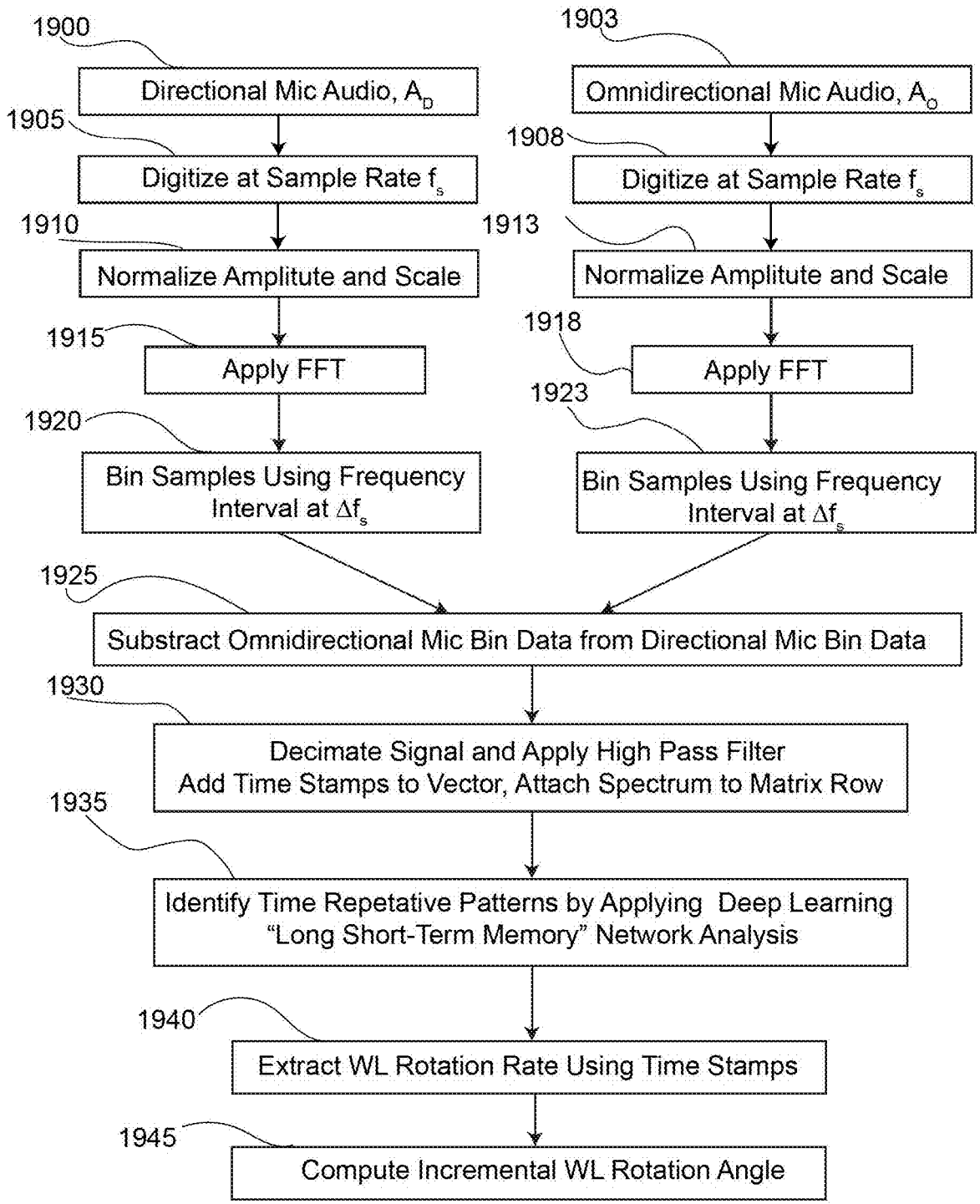
FIG. 19 shows a simplified flowchart of a method for measuring incremental rotation angles of a WL using audio signals from microphones shown in FIG. 18.

In an embodiment, FIG. 19 shows a simplified flow chart of detecting $\Delta\emptyset_{INCR}$ based on signals from the microphones of the WLM 1800 described above. At step 1900 and 1903, signals from a directional microphone $A_D$, and omnidirectional microphone $A_O$ are acquired as the WL module 1600 rotates synchronously with a WL. At steps 1905 and 1908 the signal from each microphone is digitized at a suitable sample rate $f_s$ sufficient to resolve WL rotation. For example, a sampling rate of 8192 Hz for each microphone which can resolve an upper of 4096 Hz audio frequency (Nyquist frequency) is useful in practice to record WL rotation. At step 1910 and 1913 the signals from each microphone are normalized and scaled, based on calibration data gathered prior to anchoring operation. Each digital signal is multiplied by a scale factor to correct for gain differences, if any, between the two microphones and associated amplifiers. At steps 1915 and 1918 each signal is transformed into the frequency domain using Fast Fourier Transform (FFT). At step 1920 and 1923, each sample is binned using a suitable frequency interval at $\Delta f_s$. In one preferred embodiment, the $\Delta f_s$ can be 32 Hz. In general, a binning frequency interval between about 20 and 100 Hz has been found to be useful, depending on the dynamic range of the microphone and audio analog to digital converter combination. (Fast Fourier transforms, binning, normalization and various other Digital Signal Processing [DSP] operations are described in Digital Audio Signal Processing, Udo Zolger, 2008, John Wiley and Sons, all of which is incorporated by reference in its entirety for all purposes). In various embodiments, a corrected spectrum in which ambient sounds and noise received by the directional microphone are reduced and/or removed is formed by subtracting the normalized spectrum of audio from the omnidirectional microphone at step 1925.

However, there are further embodiments, where steps 1900 through 1925 are performed in a different manner. For example, ambient sounds and noise received by a directional microphone can be reduced and/or removed by subtracting normalized analog audio signals from one or more omnidirectional microphones using analog circuitry. In some further embodiments, respective directional and omnidirectional microphone signals are digitally sampled and normalized before subtracting the respective time domain samples (prior to performing any Fourier transformation).

WL rotation speed can vary from 0.01 revolution per sec to as 10 revolution per sec. The number of samples collected and maintained is generally greater than the number representing 1 full rotation of the WL because of the high variability of the WL rotation speed. The number of samples corresponding to at least 2-3 rotations is found to be appropriate to ascertain to extract a WL rotational pattern. Hence, it is preferred to acquire higher number of samples and decimate the signals instead of dynamically changing the sample rate.

Where an audio sampling rate performed is excessive relative to the rate of WL rotation, the difference spectrum can be 'decimated' using a common DSP method to reduce apparent sampling frequency at step 1930. In a number of applications, a sampling frequency less than 1/10 of the inherent time necessary for a WL to rotate 1 degree is excessive. Decimation can be performed by repeatedly accumulating and averaging a selected number of sequential spectra to filter out spurious background. For example, a sampling rate of 8192 $sec^{-1}$ used by some audio acquisition software/hardware means is much higher than necessary for sampling conventional WL rotation. Spectra obtained from performing an FFT of the 8192 sample/sec data stream can be decimated by averaging each consecutive group of 256 spectra which corresponds to an effective sample of 32 Hz. The resulting spectrum is added as a row to an N×256×1 matrix, wherein N is the number of samples computed every 31.25 ms, 256 is the number of frequency bins and 1 is the timestamp at which the sample was recorded. Actual number of samples that get averaged and stored in the matrix varies depending on the WL rotation speed during anchoring.

A standard Artificial Intelligence (AI) technique or a deep learning method can be applied to the timestamped spectrum data to detect periodic repetitive patterns associated with full rotations of the WL. At step 1935 a Long Short-Term Memory neural network can be applied to the matrix to detect audio patterns from a rotating WL in an embodiment (Deep Learning for Time Series Forecasting, Predict the Future with MLPs, CNNs and LSTMs in Python, Jason Brownlee, https://machinelearningmastery.com/deep-learning-for-time-series-forecasting/, retrieved on Mar. 23, 2021, all of which are hereby incorporated by reference in its entirety). At step 1940 the WL rotation rate is extracted using time stamps. At step 1945 an incremental WL rotation angle, $\Delta\emptyset_{INCR}$, can be computed from the time variant patterns.

Many smartphones and tablets comprise embedded DSP and AI software libraries and their computational capabilities are sufficient to perform the various functions and/or operations described herein. The signal to noise ratio when detecting of a WL rotation angle can be optimized by modifying sample rates, FFT bin count, decimation, and/or integrating method with an AI technique to discern the time patterns in the time varying FFT spectrum depending on the embodiment. Where there is a noisy signal, sound fields from a plurality of directional microphones can be useful to extract characteristic patterns operable to detect and quantify WL rotation.

In further embodiments, a WLM can have a plurality of electromagnetic radiation sensors to sense electromagnetic radiation such as light in the vicinity of a windlass to detect a rotation angle. A windlass can be configured to have respective (directional and omnidirectional) radiation sensors (for example light sensors) in place of the directional microphone 1810 and omnidirectional microphone 1805. Signals received by the respective electromagnetic radiation sensors can be processed in a manner substantially equivalent to the signal processing disclosed for processing analogous sound signals to determine an incremental angle of windlass rotation, and the incremental angle can be sent to a remote computing device using the apparatus and methods disclosed herein.

WL Modules Comprising an Emitter and Receiver

There are further embodiments where both an emitter and a receiver are included on the WLM.

Figure 20:
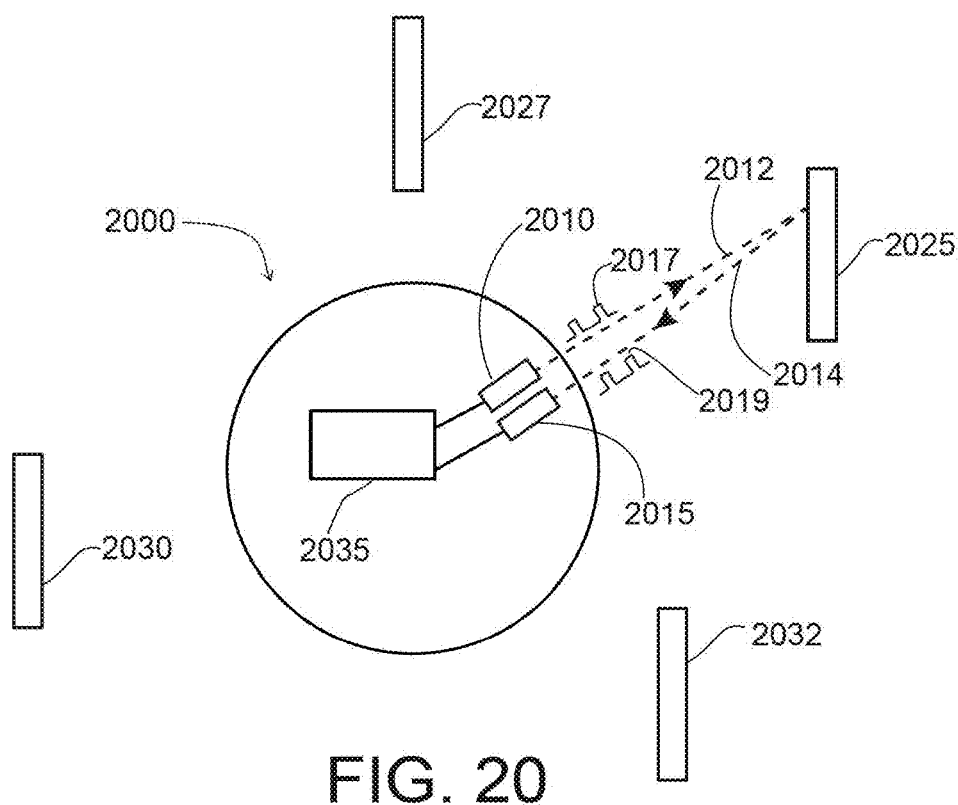
FIG. 20 shows a simplified embodiment of a WLM having both a signal emitter and receiver in the module to determine rotation of a WL.

FIG. 20 shows a simplified diagram of a WLM 2000 including a signal emitter 2010 and a signal receiver(detector) 2015 to determine rotation of a WL. The module 2000 can be securely attached to a WL as described above with respect to FIG. 14A-C. The emitter 2010 emits a signal 2012 which is reflected by a structure 2025 at a fixed position in the environment of the boat surrounding the WL. In various embodiments, the emanating signal 2012 can be coherent or incoherent visible, infrared, radiofrequency, microwave, or terahertz radiation, and others. Depending on the embodiment, the signal emitter can be an LED, a laser, an rf, microwave or terahertz source, an ultrasonic sound generator, and others. In further embodiments, the emitter can generate a signal comprising characteristic information such as an emitting time, (e.g. emission start time), a signal modulation, and/or signal to noise improvement means such as a pulse code 2017 useful to discriminate against background noise, as is represented in FIG. 20. A receiver 2015 can be used to detect the time when the reflected signal 2014 has returned to the WLM. In preferred embodiments the signal is emitted in a directed beam using prior art optical, antenna, or sonic beam forming methods, depending on the embodiment. In various embodiments, a portion of the emanating signal at the point of emission can be scattered into the receiver (e.g. in some embodiments, a window or partially reflecting mirror can be situated to backscatter some emanating signal into the receiver) to provide a signal emission time mark at the receiver. As the WL rotates, structures (or objects) 2025, 2027, 2030, 2032 at fixed positions in the environment of the boat surrounding the WL are identified based on characteristic transit times for the emanating signal to travel to each structure surrounding WL and return to the WLM (such as used by various laser rangefinders to measure a distance), and intensity, phase, and pulse characteristics of the emanating signal 2012 and the reflected signal 2014. A microcontroller 2035 receives the data from the emitter 2010 and the receiver 2015 for each structure and transmits these to computing devices to determine rotation of the WL during anchoring.

The WLM 2000 includes all support electronic and electromechanical devices as disclosed above and can be securely attached to a WL using a keyshaft 1405 as described with respect to FIG. 14A-C, and have a cover 1504 as disclosed with respect to FIG. 15A.

WLMs Detecting WL Motion Using an Exterior Emitter and Receiver

In alternative embodiments, an emitter and a receiver are both in the environment (exterior) at a fixed boat position in an unobstructed line of sight of a WLM to determine rotation of a WL.

Figure 21:
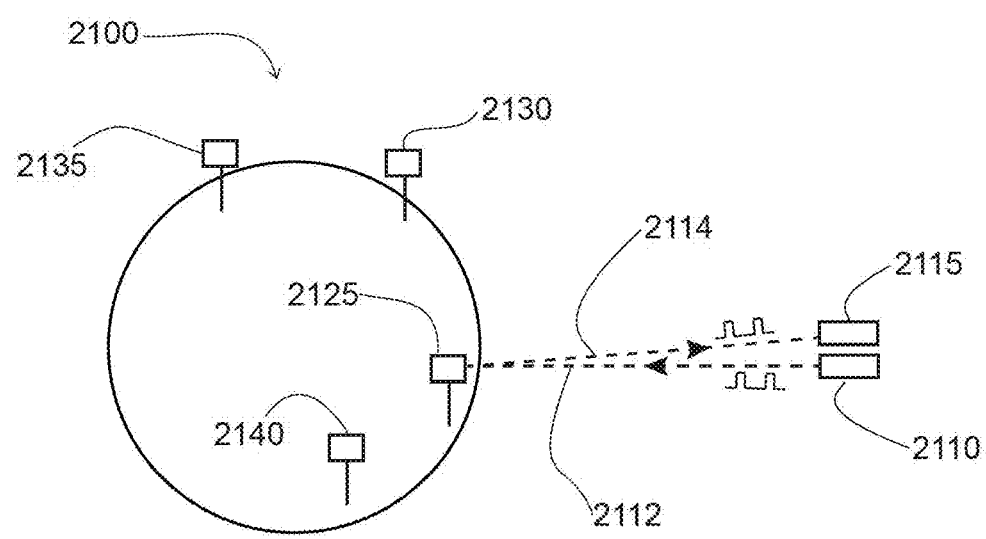
FIG. 21 shows an embodiment of measuring rotation of a WL using both an emitter and a receiver at a fixed position in the environment of the boat surrounding the WL.

A simplified diagram of a WLM 2100 including at least two or more target elements (or reflectors) placed in distinct positions on the WLM is illustrated in FIG. 21. In further embodiments, the target elements on the WLM can be mounted asymmetrically with respect to the center point of the WML and/or can be made from different materials to improve the detection. A signal emitter 2010 emits a signal 2112 which is reflected by a target element 2125 on the WLM 2100. The reflected signal 2114 is detected by a signal receiver 2115. As the WL rotates, the positions of each target elements/reflectors 2125, 2130, 2135, 2140 on the WLM 2100 are identified based on the characteristic transit times, intensity, phase, and pulse characteristics of the emanating signal 2112 and the reflected signal 2114 as described above. Data collected r from the emitter and the receive regarding to each target element are transmitted to a computing device to determine rotation of a WL.

The WLM 2100 includes all support electronic and electromechanical devices as disclosed above and can be securely attached to a WL using a keyshaft 1405 as described with respect to FIG. 14A-C, and have a cover 1504 as disclosed with respect to FIG. 15A.

A system for measuring the rate and total length of rode release can include a processor, memory media, display, digital camera, human input device, a speaker, and application programs operable to perform the various functions and provide a human interface. In some embodiments, the system can be a cellular smartphone having a processor, memory media, display, digital camera, human input device, speaker, and application programs operable to perform the various operations and provide the human interface.

Disclosed methods can be performed using a single device such as a smartphone, a tablet computer and/or other mobile computing device. A smartphone has capabilities to capture video frames, perform real time analysis of the video frames to compute an incremental WL rotation angle, the length and rate of rode release, and display these computed results and other critical anchoring information to users.

Another aspect of the implementation of the disclosed methods includes incorporation of a wireless network to improve overall system reliability and flexibility for safe anchoring. Data acquired from various WL modules such as a module with microphones and/or MEMS sensors described above can be sent to a remote device extracted via a wireless network. A remote device can process these data to compute the length and rate of the rode released, can display real time values of these parameters together with other critical anchoring parameters such as speed of boat, distance from anchoring site, can also provide specific alerts to crew members.

In some embodiments, a commonly used wireless local network protocol 802.11 or other wireless communication means such as Bluetooth, NFC (near field communication) Zigbee, Z-Wave, and/or a cellular network protocol such as 2G, 3G, 4G, LTE, 5G and others can be useful for anchoring applications. For example, with the presence of such a wireless network, particularly those standard integrated in commercial off the shelf devices that crew members are likely to have in their possession—WiFi, BlueTooth, NFC and cellular, the distribution of functions across multiple devices can be advantageous. Having such commercial devices on a boat and access to a data network, functions of Data Analysis and Display Alert can be implemented in many configurations and with many levels of redundancy as required.

Using various methods and apparatus disclosed herein, it is possible to conveniently measure the length of a rode released by a WL during the course of an anchor operation. Most boats have Global Navigation Satellite Systems (GNNS) installed so they can navigate properly on the open sea. Most mobile phone and tablets also have Global Positioning System (GPS) transceivers allowing them to sense position via the GPS constellation of satellites. Using the GPS positioning sensors of either the boat or mobile devices, the velocity of a boat can also be measured. If both rode release and boat velocities can be displayed and/or detected on the same computing device they can be compared in real time. Such a technique is highly advantageous to the helmsperson and skipper of a boat. Except for the large and expensive boats in the class of container ships, tankers, pleasure cruisers, etc. such capabilities have not existed on the vast majority of boats.

During the course of anchoring, it is important to know instantaneous rate of rode release, instantaneous boat speed, and total length of rode released, and total distance travelled by the boat from the target anchor position. As described above, if the boat is moved faster than the rate of chain release, there is a likelihood of dragging the anchor from its initial target position. If, on the other hand, boat speed is relatively low, rode can accumulate on the seabed in a loose configuration without securing the boat. Accordingly, after the anchor is dropped near vertically to its target position, subsequent chain release should be at a rate that exceeds boat velocity. Hence these functionalities must be simultaneously monitored, and displayed in a human interface.

If the value of boat velocity falls outside a specific range, a visual and/or audio alarm can warn the helms person controlling the velocity and direction of the boat. Total rode length released, total boat distance travelled, rate of rode release and boat velocity can all be monitored simultaneously and displayed on a smartphone and/or tablet by each crew member, skipper, and helms person via a wireless network to avoid potential anchoring issues described above.

Various methods to use information relating to the position and/or speed of a boat, water depth, the rate of rode release, and the algebraic sum of rode length that has traveled through the WL gypsy to perform a reliable and/or secure anchoring operation are disclosed. Boat speed, positional information and/or water depth can be obtained using methods such as GNSS, sonar, pitometer, mapping data, and others. A methods and systems are disclosed to give crew members an ability to adjust the position and speed of the boat in real time to maintain a cooperative relationship between a selected rate of anchor rode release, boat velocity, and boat position that is operable to effectuate a safe and reliable anchoring operation. These methods and systems can include a human interface having a display showing the real time ratio of the boat velocity to the rate of anchor chain release. Human interface can communicate calculated and/or predetermined target values of various parameter and alarms where a parameter value is outside a determined range.

In some embodiments, a method of simultaneously measuring boat speed, its distance from anchor (in units of measure relevant to the rode length) together with the incremental rode released throughout the anchoring operation is disclosed. Boat position is measured via GNSS through the triangulation of readings from multiple satellites. Many portable mobile devices such as smartphones and/or tablets within the wireless data network can provide position data of a boat.

Water depth is another critical parameter for anchoring operation, which can be measured by a crude sonar device mounted at the bottom of the hull near midship of a boat. The sonar device is particularly important to prevent a boat touching to the surface of the sea bed in shallow water. To compute the actual water depth at midship, a crew member must add the boat's draft (distance from surface to bottom of boat). The resulting value can be entered into the application running on the smartphone. Alternatively, during the course of dropping anchor at the anchor site there is a brief change in rode tension and WL rotation speed at the point that the anchor reaches sea bed. In some embodiments, this discontinuity in rode tension can be used to determine water depth since the rate and length of rode released is monitored continuously via various methods disclosed herein.

Another aspect of this disclosure is an application operable to provide crew members with critical real time control and measurement information about the state of an anchoring operation.

A preferred embodiment has a specific application that can be run on a mobile device operable to acquire, compute, and display a boat position, distance from the anchor site, boat speed, and rode release rate and length. The application acquires and stores the boat position relative to a selected anchoring site. As the boat backs away from the selected anchoring site, the application can update and display the instant boat position, and can compute and display the real time distance between real time boat position and the selected anchoring site. The application can also display real time boat velocity, and a time-average and/or real time speed at which the boat is moving from the anchoring site; the application can also display a continuously updated total length and real time rate of rode release.

In this embodiment, the application is operable to compare the rate of rode being released to the real time boat speed and/or the total length of rode that has been released to distance that the boat has moved from the anchoring site. If a real time value of the ratio between the boat speed and rate of rode being released falls below a selected value, visual and/or audio alerts can be sent, displayed, or otherwise sounded to alert the helms person and/or crew to attend to the speed and direction of the boat. In view of the disclosure above, those having ordinary skill in the art will recognize that the application can monitor, detect, and alarm based on relatively more complex conditions comprising the boat speed, rate of rode release, amount of rode released, distance between the boat and the anchoring site, and/or seabed depth profile.

The parameter values, alerts and alarms, and other information from the application executing on a first device can be sent (pushed) or accessed (pull) by various other computing devices used by other crew members (including a skipper, helms person, etc) by way of a wireless network. Depending on the embodiment, the architecture of these additional devices can be the same as the first device, or the various devices can be heterogenous (e.g. they may be an Android tablet and/or smartphone, a laptop Windows computer, an Apple iPad or iPhone, and/or others). Because data, alerts, and/or alarms can be accessed and/or pushed to in this manner, prospective and current anchoring issues or exigencies can be promptly detected and avoided.

Various embodiments have a human interface operable for an operator to manually enter the water depth, or an application can automatically acquire the water depth based on a geophysical location. The geophysical location can be sensed using GPS, GNSS, and/or other navigation means. The anchoring application can compute a total length of rode to release and/or remaining length to be released. When the total length has been released, the crew is alerted to stop further rode release and to stop or disengage the boat engine.

Figure 22A:
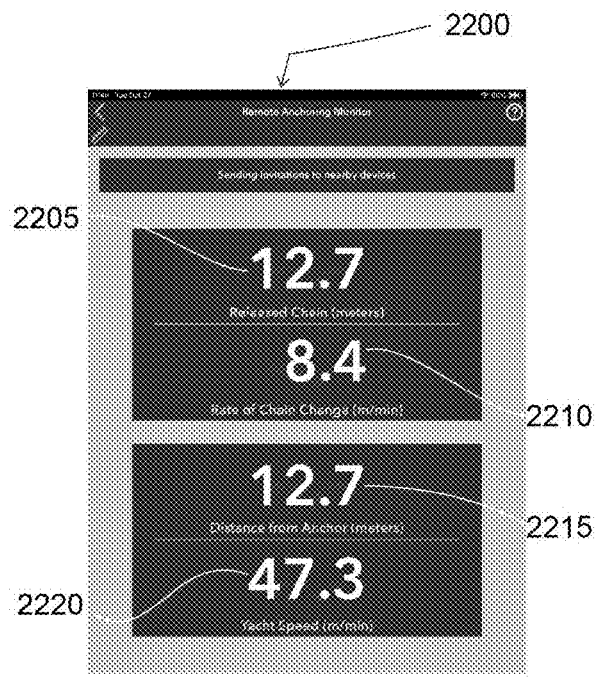
FIG. 22A shows an embodiment of an iPad screen image displaying recorded and computed WL rotation measurements.

FIG. 22A shows a screen shot 2200 from an application made to run on an Apple iPad according to these teachings. The application displays released chain 2205, rate of chain release 2210, distance from anchor site 2215, and yacht speed 2220 in real time via wireless network based on data received from a computing device performing the frame by frame image analysis of video frames having a distinguishable marking on a WLC to determine incremental WL rotation angle as described above.

The user interface can include a graphic simulation of the boat on the water as the anchor operation proceeds, an anchoring progress indicator, and/or synthetic speech announcing measurement data and milestones during anchoring. Audio alerts and/or cues can include sounds such as beeps that can be loud or can increase or decrease in volume, frequency, or pitch depending on boat speed, rode speed, and/or difference in and/or between these parameters, depending on the embodiment. The user interface can also include visual cues such as a flashing and/or blinking screen, colored indicators or color changes, including changes in the appearance of the value of a quantity or signal that can be altered at a frequency proportional to values and/or differences in parameter values depending on boat and/or rode speeds and/or boat position.

One embodiment of the instant disclosure utilizes the collected and wirelessly transmitted data to control the operation of the WL and/or boat engine throttle. A specialized device attaches to the WL control button connections to enable up-down, on-off operation from a separate computing device. The buttons are simple closure devices so the interface consists of simple relays controlled by a microcontroller receiving signals over a WiFi network. Integrating control over an engine throttle is a more complex task and can require a mechanically controlled device attached via a mechanical linkage to the air intake of a diesel engine. Such a device would again, be interfaced to a microcontroller system with small robotic arm receiving control signals via the WiFi network.

FIG. 12 shows examples of visual cues displayed to users during an anchoring operation such as the detections of a WL, a marking on the WL, and WL rotation. There are embodiments where additional instructions can be given the users to simplify the execution of the anchoring methods described herein. These instructions can provide further guidance to the user under various circumstances including if a WLC can move out of a camera view when capturing video frames, if marking on a WLC and/or a WL module not detected from the video images captured, if the WL starts rotating and/or changes its direction of rotation during anchoring, if there is a change in stress in the rode detected (an indication of an anchor reached seabed). These alarms/alerts can be presented visually and/or vocally (such as in the form of beeps, sustained sounds and/or speech) to enhance user experience and system accuracy and reliability.

Figure 22B:
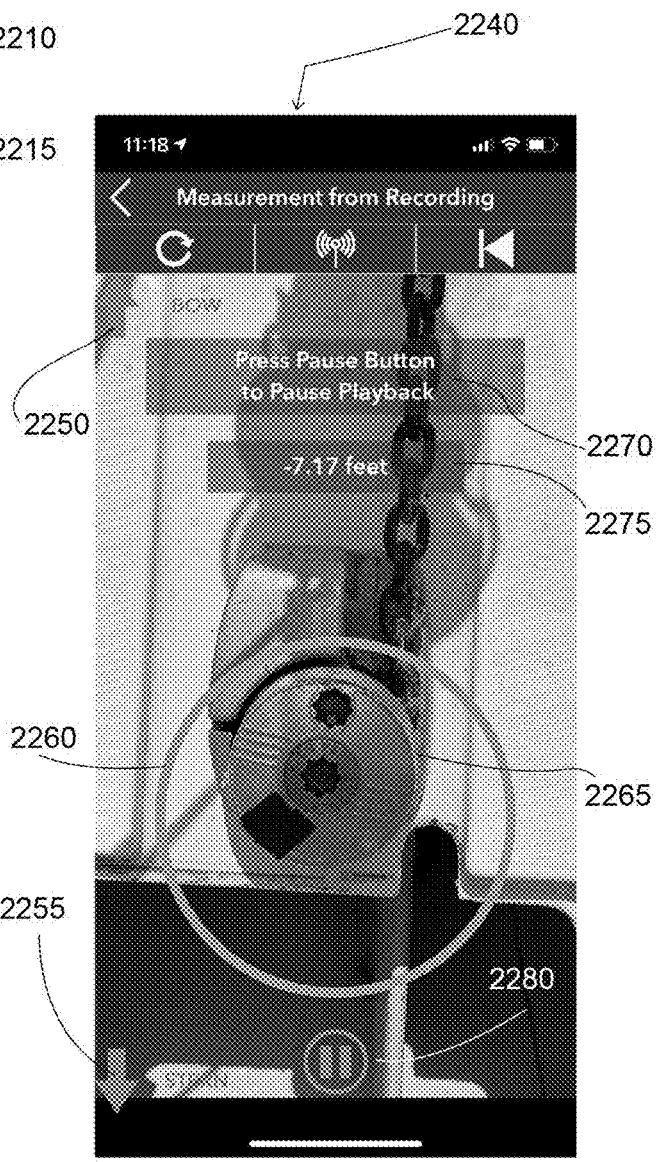
FIG. 22B shows a screen image of an iPhone displaying WL rotation measurements and visual cues and alerts in an embodiment.

FIG. 22B shows a screen shot from an application made to run on an Apple iPhone during an anchoring operation. Display image 2240 includes various user instructions to execute the methods disclosed herein smoothly. Two arrows indicating the directions of bow 2250 and stern 2255 of a boat guide a crew member to orient the iPhone camera when capturing video images of a WL. A circular WL Guide 2260 provides a virtual instruction on a screen for a crew member to maintain a WL capstan image 2265 in full view within the boundary of the WL guide 2260 and in a preferred WL size. In some embodiments, the WL guide can change color during the course of data analysis depending on the state of the rotation detection algorithm (see FIG. 12). For example, the initial WL guide 2260 can be black. When a circle defining the outermost edge of the WLC is detected, the display shows the WL guide 2260 in yellow. When a marking on the WLC (such as a black tape as seen in FIG. 12) is detected, the WL guide 2260 can be displayed in green. A "video play" button 2280 at the bottom of the screen indicates that the system is ready for measurement. When the button 2280 is selected, "video pause" text display appears on the screen to inform the crew member to stop the measurement. A text display such as "Press Pause Button to Pause Playback" 2270 provides the crew member further instructions on next steps and/or warnings about a problem. A running meter 2275 displays the actual rode length as it is being measured. In some embodiments, additional information such as boat speed or boat distance from anchor site (not shown in this screen image) can be displayed to inform the crew members during anchoring.

Crew members at sea may not have an access to high speed internet during the deployment of the disclosed methods. Hence, the raw data obtained during the course of measurements and the associated metadata are saved, analyzed and stored in a local device database initially, and uploaded to a remote server database once access to the internet is available. The acquired data is generally uploaded to a remote data center facility for storage and further offline testing. The algorithms and parameters used in the disclosed methods are modified an ongoing basis at the data center facility comprising more powerful CV, AI and DSP libraries to further improve overall system reliability and accuracy. The data recorded from various anchoring operations at different lighting and/or weather conditions, or different water depth by different crew members on different types of boats with different types of windlasses can be examined further to test and improve the performance of the algorithms. In some embodiments, the modified algorithms can be applied across all system deployments. In other embodiments, the algorithms can be fine-tuned to use for a specific family of windlasses and/or gypsies. In further embodiments, the algorithms can be adapted to enhance the measurement reliability on a specific type of a boat. In still further embodiments, a particular emphasis can be given to increase robustness of detection and tracking of a characteristic marking on the WLC by the CV subsystem under changing anchoring conditions.

In the foregoing specification, various aspects are described with reference to specific embodiments, but those skilled in the art will recognize that further aspects are not limited thereto. Various features and aspects described above may be used individually or jointly. Other aspects of the invention, including alternatives, modifications, permutations and equivalents of the embodiments described herein, will be apparent to those skilled in the art from consideration of the specification, study of the drawings, and practice of the various aspects. Further, various aspects can be utilized in any number of environments and applications beyond those described herein without departing from the broader spirit and scope of the description. The written description and accompanying drawings are, accordingly, to be regarded as illustrative rather than restrictive.

Although various embodiments have been presented and explained using simplified examples, it will be understood that various changes and modifications are possible with regard to materials, shapes, and dimensions, without departure from the scope of the patent claims. The embodiments and preferred features described above should be considered exemplary, with the invention being defined by the appended claims, which therefore include all such alternatives, modifications, permutations and equivalents as fall within the true spirit and scope of the present disclosure.

What is claimed is:

1. A windlass module configured to securely attach onto a windlass in a fixed position wherein the windlass module comprises means for sensing a signed incremental angle of windlass rotation between a prior and a current angular position of the windlass in real time, the windlass module further comprising means for wirelessly sending the signed real time incremental angle of windlass rotation to a remote computing device in real time.

2. The windlass module of claim 1 further comprising a baseplate having keyshaft means for attaching the windlass module to the windlass in a fixed position using a winch handle socket of the windlass.

3. The windlass module of claim 2, wherein the keyshaft means comprises a keyshaft having a shape and dimensions operable to lock the keyshaft into a fixed position in a standard windlass winch handle socket of the windlass.

4. The windlass module of claim 1 wherein the means for sensing the signed incremental angle of windlass rotation between a prior and a current angular position of the windlass comprises a transmitter operable to emit directional radiation selected from the group consisting of sound and electromagnetic radiation.

5. The windlass module of claim 4 wherein the directional radiation comprises pulses.

6. The windlass module of claim 5 wherein the pulses comprise a characteristic pattern operable to discriminate against background noise.

7. The windlass module of claim 4 wherein the transmitter of directional electromagnetic radiation includes a component selected from among the group consisting of a light emitting diode, a laser, a radio wave emitting device, a source of microwave radiation, and a source of terahertz radiation.

8. The windlass module of claim 1 wherein the means for sensing the signed incremental angle of windlass rotation between a prior and a current angular position of the windlass comprises a directional receiver selected from the group consisting of a directional microphone and a directional electromagnetic radiation receiver.

9. The windlass module of claim 8 wherein the directional electromagnetic radiation receiver comprises a component selected from the group consisting of a solid state photodetector, a radiofrequency detector, a microwave radiation detector, and a terahertz radiation detector.

10. The windlass module of claim 1, wherein said windlass module comprises electronic and/or electromechanical motion sensing instrumentation configured to sense the signed incremental angle of windlass rotation, and wherein said motion sensing instrumentation comprises:
   a processor and a wireless communications interface;
   at least one sensing device selected from the group consisting of a gyroscope, an accelerometer, a strain gage, a magnetometer, an inertial measurement unit, an eCompass, a directional electromagnetic radiation receiver, and a directional microphone; and
   tangible media comprising data and instructions operable for the processor to: acquire information from each of the sensing devices,
      determine the signed incremental angle of windlass rotation using the information acquired from at least one of the sensing devices, and
      transmit the signed incremental angle of windlass rotation wirelessly to a remote computing device in real time using the wireless communications interface;
   whereby a processor performing a software application is operable to determine a real time length of rode traversing the gypsy of the windlass on the boat based on the signed incremental angle of windlass rotation.

11. The windlass module of claim 1 further comprising:
   a radiation emitter secured in a first fixed position on the windlass module, the radiation emitter being configured to emit radiation in a generally radial direction from the windlass wherein a portion of the emitted radiation is operable to reach a radiation reflector at a fixed position in the environment of the boat having an unobstructed line of sight to the windlass module, and be reflected back to the windlass module on the windlass, and a radiation receiver secured in a second fixed position on the windlass module, the radiation receiver being configured to receive the portion of the emitted radiation being reflected back to the windlass module on the windlass;

a processor and a wireless communications interface; and tangible media having data and instructions operable for the processor to:

determine the signed incremental angle of windlass rotation based on receiving the reflected portion of the emitted radiation, and to wirelessly transmit the signed incremental angle of windlass rotation to a remote computing device in real time using the wireless communications interface;

whereby the remote computing device can determine a length of rode traversing the gypsy of the windlass in real time based on receiving the signed incremental angle of windlass rotation.

12. The windlass module of claim 11 wherein the emitted radiation comprises pulses and sensing the signed incremental angle of windlass rotation depends on a transit time for a pulse of the emitted radiation to travel from the radiation emitter on the windlass to the radiation reflector in the environment.

13. The windlass module of claim 1 further comprising:

one or more radiation receivers secured in distinct predetermined positions on the windlass module wherein each radiation receiver is configured to receive radiation emanating from at least one radiation emitter in the environment of the boat having an unobstructed line of sight to the windlass;

a processor and a wireless communications interface; and tangible media comprising data and instructions operable for the processor to determine the signed incremental angle of windlass rotation based on the emanating radiation received by at least one of the radiation detectors, and to wirelessly transmit the signed incremental angle of windlass rotation to a remote computing device in real time using the wireless communications interface;

whereby the remote computing device can determine a length of rode traversing the gypsy of the windlass in real time based on the signed incremental angle of windlass rotation.

14. An apparatus for determining a length of rode traversing a gypsy of a windlass on a boat in real time during an anchoring operation, the apparatus comprising a windlass module configured to securely attach onto the windlass in a fixed position, wherein the windlass module comprises electronic and/or electromechanical motion sensing instrumentation configured to provide parameter values determining a rate and amount of angular rotation of the windlass, wherein the motion sensing instrumentation comprises:

a processor and a wireless communications interface;

at least one sensing device selected from the group consisting of a gyroscope, an accelerometer, a strain gage, a magnetometer, an inertial measurement unit, an eCompass, a directional electromagnetic radiation receiver, and a directional microphone; and tangible media comprising data and instructions operable for the processor to: acquire a plurality of measurement values from each of the sensing devices, determine a rotational motion of the windlass based on the measurement values acquired from at least one of the sensing devices, and transmit information selected from the group consisting of the measurement values acquired from at least one of the sensing devices, a characteristic of the rotational motion of the windlass, a direction of windlass rotation, and an angle of windlass rotation to a remote computing device in real time through the wireless communications interface;

whereby the remote computing device is operable to determine a signed incremental angle of windlass rotation based on the information received from the windlass module.

15. The apparatus of claim 14 further comprising tangible media having data and instructions operable for a portable computing device selected from a smartphone, a tablet computing device, and a portable computer to display at least one of a length of rode traversing the gypsy of the windlass and a rate of rode being released or gathered by the windlass in real time during an anchoring operation.

16. A system for determining a length of rode traversing a gypsy of a windlass on a boat in real time during an anchoring operation comprising:

a windlass rotation detection system comprising a windlass module configured to securely attach to the windlass in a fixed position, and two or more radiation elements selected from the group consisting of a radiation emitter, a radiation receiver, and a radiation reflector, wherein the two or more radiation elements are arranged in a configuration selected from the group of radiation element configurations consisting of (1), (2), (3), and (4):

(1) one or more radiation emitters attached to the windlass module in distinct positions, wherein each radiation emitter is configured to emit radiation in a generally radial direction from the windlass into an environment facing the windlass, and at least two radiation receivers, each radiation receiver being configured to be supported in the environment of the boat at a respectively different fixed position having an unobstructed line of sight to the windlass, wherein each radiation receiver is operable to receive radiation from a radiation emitter attached to the windlass;

(2) a plurality of radiation emitters, each radiation emitter being configured to be supported in the environment of the boat at a respectively different fixed position having an unobstructed line of sight to the windlass, wherein each radiation emitter is operable to transmit radiation to the windlass, and one or more radiation receivers attached to the windlass module in distinct positions, wherein each radiation receiver is adapted to receive radiation from at least one of the radiation emitters in the environment;

(3) a radiation emitter configured to be supported in the environment of the boat at a first fixed position having an unobstructed line of sight to the windlass, wherein the radiation emitter is adapted to transmit radiation to the windlass from the first fixed position, two or more radiation reflectors attached to the windlass module in distinct positions, wherein each of the radiation reflectors is adapted to reflect a portion of radiation emanating from the radiation emitter at the first fixed position in the environment to a second fixed position in the environment of the boat having an unobstructed line of sight to the windlass, and
a radiation receiver configured to be supported in the environment of the boat at the second fixed position, wherein the radiation receiver is adapted to receive a portion of the emanating emitter radiation reflected from each of the radiation reflectors to the second fixed position; and
(4) a radiation emitter attached to the windlass module in a first distinct position, wherein the radiation emitter is adapted to emit radiation reaching a fixed position in the environment of the boat having an unobstructed line of sight to the windlass;
a radiation reflector configured to be supported in the environment of the boat at a fixed position having an unobstructed line of sight to the windlass, wherein the radiation reflector is adapted to reflect a portion of emitted radiation reaching the fixed position in the environment back to the windlass, and
a radiation receiver attached to the windlass module in a second distinct position wherein the radiation receiver is adapted to receive the portion of emitted radiation reflected from the radiation reflector at the fixed position in the environment; and
tangible media comprising data and instructions operable for a processor to determine the length of rode traversing the gypsy of the windlass on a boat in real time during an anchoring operation, based on the emitting, reflecting, and receiving of the radiation.

17. The system of claim 16 wherein the rotation detection system includes a radiation emitter, a radiation receiver, and a radiation reflector, wherein:
the radiation emitter and the radiation receiver are attached to the windlass module in distinct positions, and the radiation reflector is configured to be supported in the environment of the boat at a fixed position having an unobstructed line of sight to the windlass;
the radiation emitter is configured to send a pulse of radiation to the radiation reflector, and the radiation receiver is configured to sense a reflected portion of the pulse of radiation returning to the windlass from the reflector at the fixed position in the environment; and
the tangible media further comprises data and instructions operable for a processor to determine an incremental angle of windlass rotation based on the sending the pulse from the radiation emitter to the radiation reflector, and the sensing of the reflected portion of the pulse with the radiation receiver.

18. The system of claim 16 wherein:
the rotation detection system includes a radiation pulse emitter and a radiation pulse receiver in a configuration selected from among radiation element configuration (1) of claim 16 and radiation element configuration (2) of claim 16;
the radiation pulse emitter is adapted to send a pulse of radiation to the radiation pulse receiver;
the radiation pulse receiver is adapted to sense a transit time of the radiation pulse traveling from the pulse radiation emitter to the pulse radiation receiver; and
the tangible media further comprises data and instructions operable for a processor to determine an incremental angle of windlass rotation based on the transit time.

19. The system of claim 16 wherein:
the rotation detection system includes a radiation signal emitter and a radiation signal receiver in a configuration selected from among radiation element configuration (1) of claim 16 and radiation element configuration (2) of claim 16;
the radiation signal emitter is adapted to emit a signal and the radiation signal receiver is adapted to receive the signal;
and the tangible media further comprises data and instructions operable for the processor to determine an incremental angle of windlass rotation using a characteristic of the received signal, wherein the signal characteristic is selected from the group consisting of a transit time, an intensity, and a phase.

\* \* \* \* \*